US012592017B2

(12) United States Patent
Harpale et al.

(10) Patent No.: US 12,592,017 B2
(45) Date of Patent: Mar. 31, 2026

(54) RENDERING XR AVATARS BASED ON ACOUSTICAL FEATURES

(71) Applicant: Meta Platforms, Inc., Menlo Park, CA (US)

(72) Inventors: Abhay Suresh Harpale, San Ramon, CA (US); Meryem Pinar Donmez Ediz, Redwood City, CA (US); Kshitiz Malik, Palo Alto, CA (US); Omer Muzaffar, Bothell, WA (US); Mridul Gupta, Newark, CA (US); Vijay Manikandan Janakiraman, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 18/353,693

(22) Filed: Jul. 17, 2023

(65) Prior Publication Data

US 2025/0029305 A1     Jan. 23, 2025

(51) Int. Cl.
| | |
|---|---|
| *G06T 13/20* | (2011.01) |
| *G06T 13/40* | (2011.01) |
| *G10L 25/63* | (2013.01) |
| *G10L 25/18* | (2013.01) |

(52) U.S. Cl.
CPC ............ *G06T 13/205* (2013.01); *G06T 13/40* (2013.01); *G10L 25/63* (2013.01); *G10L 25/18* (2013.01)

(58) Field of Classification Search
CPC ........ G06T 13/205; G06T 13/40; G10L 25/63
See application file for complete search history.

(56) References Cited

U.S. PATENT DOCUMENTS

| | | | |
|---|---|---|---|
| 5,926,537 | A | 7/1999 | Birze |
| 6,014,439 | A | 1/2000 | Walker et al. |
| 7,124,123 | B1 | 10/2006 | Roskind et al. |
| 7,158,678 | B2 | 1/2007 | Nagel et al. |
| 7,397,912 | B2 | 7/2008 | Aasman et al. |
| 7,613,287 | B1 | 11/2009 | Stifelman et al. |

(Continued)

FOREIGN PATENT DOCUMENTS

| | | | |
|---|---|---|---|
| AU | 2021104773 A4 | 4/2022 | |
| CN | 114242037 A | 3/2022 | |

(Continued)

OTHER PUBLICATIONS

US 11,663,818 B2, 05/2023, Presant et al. (withdrawn)

(Continued)

*Primary Examiner* — King Y Poon
*Assistant Examiner* — Vincent Peren
(74) *Attorney, Agent, or Firm* — Morgan, Lewis & Bockius LLP

(57) ABSTRACT

In one embodiment, a method includes receiving a voice input having acoustic features from a first client system associated with a first user, determining emotions associated with the voice input based on one or more of the acoustic features by machine-learning models, determining facial features for a first extended-reality (XR) avatar representing the first user based on the emotions, and sending instructions for rendering the first XR avatar representing the first user to a second client system associated with a second user, wherein the first XR avatar is rendered with the determined facial features.

20 Claims, 11 Drawing Sheets

(56) References Cited

U.S. PATENT DOCUMENTS

| | | | |
|---|---|---|---|
| 7,889,853 B2 | 2/2011 | Sutcliffe | |
| 8,027,451 B2 | 9/2011 | Arendsen et al. | |
| 8,178,305 B2 | 5/2012 | Kohara et al. | |
| 8,204,200 B2 | 6/2012 | Wang et al. | |
| 8,205,099 B2 | 6/2012 | Hussain et al. | |
| 8,396,708 B2 | 3/2013 | Park et al. | |
| 8,560,564 B1 | 10/2013 | Hoelzle et al. | |
| 8,660,247 B1 | 2/2014 | Brown | |
| 8,677,377 B2 | 3/2014 | Cheyer et al. | |
| 8,935,192 B1 | 1/2015 | Ventilla et al. | |
| 8,983,383 B1 | 3/2015 | Haskin | |
| 9,154,739 B1 | 10/2015 | Nicolaou et al. | |
| 9,251,471 B2 | 2/2016 | Pinckney et al. | |
| 9,299,059 B1 | 3/2016 | Marra et al. | |
| 9,304,736 B1 | 4/2016 | Whiteley et al. | |
| 9,338,242 B1 | 5/2016 | Suchland et al. | |
| 9,338,493 B2 | 5/2016 | Van Os et al. | |
| 9,390,724 B2 | 7/2016 | List | |
| 9,418,658 B1 | 8/2016 | David et al. | |
| 9,472,206 B2 | 10/2016 | Ady | |
| 9,479,931 B2 | 10/2016 | Ortiz, Jr. et al. | |
| 9,576,574 B2 | 2/2017 | Van Os | |
| 9,639,608 B2 | 5/2017 | Freeman | |
| 9,659,577 B1 | 5/2017 | Langhammer | |
| 9,720,955 B1 | 8/2017 | Cao et al. | |
| 9,747,895 B1 | 8/2017 | Jansche et al. | |
| 9,792,281 B2 | 10/2017 | Sarikaya | |
| 9,858,925 B2 | 1/2018 | Gruber et al. | |
| 9,865,260 B1 | 1/2018 | Vuskovic et al. | |
| 9,875,233 B1 | 1/2018 | Tomkins et al. | |
| 9,875,741 B2 | 1/2018 | Gelfenbeyn et al. | |
| 9,881,077 B1 | 1/2018 | Alfonseca et al. | |
| 9,886,953 B2 | 2/2018 | Lemay et al. | |
| 9,990,591 B2 | 6/2018 | Gelfenbeyn et al. | |
| 10,042,032 B2 | 8/2018 | Scott et al. | |
| 10,127,220 B2 | 11/2018 | Bellegarda et al. | |
| 10,134,395 B2 | 11/2018 | Typrin | |
| 10,199,051 B2 | 2/2019 | Binder et al. | |
| 10,241,752 B2 | 3/2019 | Lemay et al. | |
| 10,276,170 B2 | 4/2019 | Gruber et al. | |
| 10,462,422 B1 | 10/2019 | Harrison et al. | |
| D868,793 S | 12/2019 | Germe | |
| 10,511,808 B2 | 12/2019 | Harrison et al. | |
| 10,515,655 B2 | 12/2019 | Un et al. | |
| D881,883 S | 4/2020 | Germe | |
| D882,567 S | 4/2020 | Parfitt | |
| D882,570 S | 4/2020 | Germe | |
| 10,719,786 B1 | 7/2020 | Treseler et al. | |
| 10,782,986 B2 | 9/2020 | Martin | |
| 10,827,024 B1 | 11/2020 | Schissel et al. | |
| 10,841,249 B2 | 11/2020 | Lim et al. | |
| 10,854,206 B1 | 12/2020 | Liu et al. | |
| 10,855,485 B1 | 12/2020 | Zhou et al. | |
| 10,896,295 B1 | 1/2021 | Shenoy | |
| 10,949,616 B1 | 3/2021 | Shenoy et al. | |
| 10,958,599 B1 | 3/2021 | Penov et al. | |
| 10,977,258 B1 | 4/2021 | Liu et al. | |
| 11,003,669 B1 | 5/2021 | Nelson et al. | |
| 11,010,436 B1 | 5/2021 | Peng et al. | |
| 11,038,974 B1 | 6/2021 | Koukoumidis et al. | |
| 11,042,554 B1 | 6/2021 | Balakrishnan et al. | |
| 11,086,858 B1 | 8/2021 | Koukoumidis et al. | |
| 11,087,756 B1 | 8/2021 | Presant et al. | |
| 11,093,551 B1 | 8/2021 | Natarajan et al. | |
| 11,100,179 B1 | 8/2021 | Zhou et al. | |
| 11,115,410 B1 | 9/2021 | Hanson et al. | |
| 11,159,767 B1 | 10/2021 | Kamisetty et al. | |
| 11,176,141 B2 | 11/2021 | Beaumont et al. | |
| 11,245,646 B1 | 2/2022 | Koukoumidis et al. | |
| 11,301,521 B1 | 4/2022 | Schissel et al. | |
| 11,308,169 B1 | 4/2022 | Koukoumidis et al. | |
| 11,308,284 B2 | 4/2022 | Huang et al. | |
| 11,341,335 B1 | 5/2022 | Crook et al. | |
| 11,368,420 B1 | 6/2022 | Crook et al. | |
| 11,442,992 B1 | 9/2022 | Moon et al. | |
| 11,443,120 B2 | 9/2022 | Poddar et al. | |
| 11,567,788 B1 | 1/2023 | Khemka et al. | |
| 11,658,835 B2 | 5/2023 | Behar | |
| 11,688,021 B2 | 6/2023 | Penov et al. | |
| 11,688,022 B2 | 6/2023 | Aghajanyan et al. | |
| 11,694,281 B1 | 7/2023 | Liu et al. | |
| 11,704,745 B2 | 7/2023 | Poddar et al. | |
| 11,715,042 B1 | 8/2023 | Liu et al. | |
| 11,861,674 B1 | 1/2024 | Huang et al. | |
| 11,893,152 B1 * | 2/2024 | Ezrielev | G06V 10/774 |
| 11,935,170 B1 * | 3/2024 | Jain | G06V 40/28 |
| 11,948,563 B1 | 4/2024 | Liu et al. | |
| 12,001,862 B1 | 6/2024 | Liu et al. | |
| 2008/0240379 A1 | 10/2008 | Maislos et al. | |
| 2008/0300884 A1 | 12/2008 | Smith | |
| 2009/0282033 A1 | 11/2009 | Alshawi | |
| 2011/0246383 A1 | 10/2011 | Gibson et al. | |
| 2012/0245944 A1 | 9/2012 | Gruber et al. | |
| 2012/0246191 A1 | 9/2012 | Xiong | |
| 2012/0265528 A1 | 10/2012 | Gruber et al. | |
| 2012/0311126 A1 | 12/2012 | Jadallah et al. | |
| 2013/0035930 A1 | 2/2013 | Ferrucci et al. | |
| 2013/0268839 A1 | 10/2013 | Lefebvre et al. | |
| 2013/0275138 A1 | 10/2013 | Gruber et al. | |
| 2013/0275164 A1 | 10/2013 | Gruber et al. | |
| 2014/0012926 A1 | 1/2014 | Narayanan et al. | |
| 2014/0032659 A1 | 1/2014 | Marini et al. | |
| 2014/0074483 A1 | 3/2014 | Van Os | |
| 2014/0129266 A1 | 5/2014 | Perl et al. | |
| 2014/0164506 A1 | 6/2014 | Tesch et al. | |
| 2014/0244712 A1 | 8/2014 | Walters et al. | |
| 2014/0280017 A1 | 9/2014 | Indarapu et al. | |
| 2014/0297284 A1 | 10/2014 | Gruber et al. | |
| 2015/0081674 A1 | 3/2015 | Ali et al. | |
| 2015/0142420 A1 | 5/2015 | Sarikaya et al. | |
| 2015/0142704 A1 | 5/2015 | London | |
| 2015/0169284 A1 | 6/2015 | Quast et al. | |
| 2015/0169744 A1 | 6/2015 | Walkingshaw et al. | |
| 2015/0179168 A1 | 6/2015 | Hakkani-Tur et al. | |
| 2015/0186156 A1 | 7/2015 | Brown et al. | |
| 2015/0207765 A1 | 7/2015 | Brantingham et al. | |
| 2015/0220888 A1 | 8/2015 | Iyer | |
| 2015/0347375 A1 | 12/2015 | Tremblay et al. | |
| 2016/0019290 A1 | 1/2016 | Ratnaparkhi et al. | |
| 2016/0037311 A1 | 2/2016 | Cho | |
| 2016/0063118 A1 | 3/2016 | Campbell et al. | |
| 2016/0196491 A1 | 7/2016 | Chandrasekaran et al. | |
| 2016/0225370 A1 | 8/2016 | Kannan et al. | |
| 2016/0255082 A1 | 9/2016 | Rathod | |
| 2016/0306505 A1 | 10/2016 | Vigneras et al. | |
| 2016/0308799 A1 | 10/2016 | Schubert et al. | |
| 2016/0328096 A1 | 11/2016 | Tran et al. | |
| 2016/0378849 A1 | 12/2016 | Myslinski | |
| 2016/0378861 A1 | 12/2016 | Eledath et al. | |
| 2017/0026318 A1 | 1/2017 | Daniel et al. | |
| 2017/0091168 A1 | 3/2017 | Bellegarda et al. | |
| 2017/0092264 A1 | 3/2017 | Hakkani-Tur et al. | |
| 2017/0132019 A1 | 5/2017 | Karashchuk et al. | |
| 2017/0142051 A1 | 5/2017 | Spivack et al. | |
| 2017/0193390 A1 | 7/2017 | Weston et al. | |
| 2017/0286401 A1 | 10/2017 | He et al. | |
| 2017/0353469 A1 | 12/2017 | Selekman et al. | |
| 2017/0358304 A1 | 12/2017 | Castillo Sanchez et al. | |
| 2017/0359707 A1 | 12/2017 | Diaconu et al. | |
| 2018/0013699 A1 | 1/2018 | Sapoznik et al. | |
| 2018/0018562 A1 | 1/2018 | Jung | |
| 2018/0018987 A1 | 1/2018 | Zass | |
| 2018/0040020 A1 | 2/2018 | Kurian et al. | |
| 2018/0052824 A1 | 2/2018 | Ferrydiansyah et al. | |
| 2018/0054523 A1 | 2/2018 | Zhang et al. | |
| 2018/0096071 A1 | 4/2018 | Green | |
| 2018/0096072 A1 | 4/2018 | He et al. | |
| 2018/0107917 A1 | 4/2018 | Hewavitharana et al. | |
| 2018/0121508 A1 | 5/2018 | Halstvedt | |
| 2018/0189629 A1 | 7/2018 | Yatziv et al. | |
| 2018/0210874 A1 | 7/2018 | Fuxman et al. | |
| 2018/0293484 A1 | 10/2018 | Wang et al. | |
| 2018/0329998 A1 | 11/2018 | Thomson et al. | |
| 2019/0035390 A1 | 1/2019 | Howard et al. | |

(56)          References Cited

U.S. PATENT DOCUMENTS

| | | | | |
|---|---|---|---|---|
| 2019/0066679 | A1* | 2/2019 | Mao | G06F 16/637 |
| 2019/0080698 | A1 | 3/2019 | Miller | |
| 2019/0082221 | A1 | 3/2019 | Jain et al. | |
| 2019/0087491 | A1 | 3/2019 | Bax | |
| 2019/0132265 | A1 | 5/2019 | Nowak-Przygodzki et al. | |
| 2019/0139150 | A1 | 5/2019 | Brownhill et al. | |
| 2019/0213490 | A1 | 7/2019 | White et al. | |
| 2019/0311036 | A1 | 10/2019 | Shanmugam et al. | |
| 2019/0324527 | A1 | 10/2019 | Presant et al. | |
| 2019/0324553 | A1 | 10/2019 | Liu et al. | |
| 2019/0324780 | A1 | 10/2019 | Zhu et al. | |
| 2019/0325042 | A1 | 10/2019 | Yu et al. | |
| 2019/0325080 | A1 | 10/2019 | Natarajan et al. | |
| 2019/0325081 | A1 | 10/2019 | Liu et al. | |
| 2019/0325084 | A1 | 10/2019 | Peng et al. | |
| 2019/0325864 | A1 | 10/2019 | Anders et al. | |
| 2019/0327330 | A1 | 10/2019 | Natarajan et al. | |
| 2019/0327331 | A1 | 10/2019 | Natarajan et al. | |
| 2019/0348033 | A1 | 11/2019 | Chen et al. | |
| 2019/0361408 | A1 | 11/2019 | Tokuchi | |
| 2020/0090393 | A1* | 3/2020 | Shin | G06V 40/174 |
| 2020/0410012 | A1 | 12/2020 | Moon et al. | |
| 2021/0117214 | A1 | 4/2021 | Presant et al. | |
| 2021/0117479 | A1 | 4/2021 | Liu et al. | |
| 2021/0117623 | A1 | 4/2021 | Aly et al. | |
| 2021/0117780 | A1 | 4/2021 | Malik et al. | |
| 2021/0118440 | A1 | 4/2021 | Peng et al. | |
| 2021/0118442 | A1 | 4/2021 | Poddar et al. | |
| 2021/0120206 | A1 | 4/2021 | Liu et al. | |
| 2022/0020196 | A1* | 1/2022 | Kuta | G10L 21/10 |
| 2022/0188361 | A1 | 6/2022 | Botros et al. | |
| 2022/0199079 | A1 | 6/2022 | Hanson et al. | |
| 2022/0210111 | A1 | 6/2022 | Greenberg et al. | |
| 2022/0319181 | A1 | 10/2022 | Kanuganti et al. | |
| 2022/0374605 | A1 | 11/2022 | Sethi et al. | |
| 2023/0128422 | A1 | 4/2023 | Li et al. | |
| 2024/0054156 | A1 | 2/2024 | Vincent et al. | |
| 2024/0078731 | A1* | 3/2024 | Beith | G06T 13/205 |

FOREIGN PATENT DOCUMENTS

| | | |
|---|---|---|
| CN | 115908653 A | 4/2023 |
| KR | 20230071053 A | 5/2023 |

OTHER PUBLICATIONS

EPO—European Search Report for European Patent Application No. 24164550.6, dated Aug. 23, 2024, 5 pages.

Alfifi M., et al., "Howdy Y'all: An Alexa TaskBot," 1st Proceedings of Alexa Prize TaskBot, 2021, 10 pages.

Co-pending U.S. Appl. No. 18/188,223, inventors Hakan; Inan et al., filed Mar. 22, 2023.

Co-pending U.S. Appl. No. 18/352,889, inventors Strauss; David et al., filed Jul. 14, 2023.

Co-pending U.S. Appl. No. 15/953,957, inventors Moujahid; Kemal El et al., filed Apr. 16, 2018.

Co-pending U.S. Appl. No. 15/967,193, inventors Testuggine; Davide et al., filed Apr. 30, 2018.

Co-pending U.S. Appl. No. 16/025,317, inventors Gupta; Sonal et al., filed Jul. 2, 2018.

Co-pending U.S. Appl. No. 16/048,049, inventor Markku; Salkola, filed Jul. 27, 2018.

Co-pending U.S. Appl. No. 16/048,072, inventor Salkola; Markku, filed Jul. 27, 2018.

Co-pending U.S. Appl. No. 16/048,101, inventor Salkola; Markku, filed Jul. 27, 2018.

Co-pending U.S. Appl. No. 16/057,414, inventors Jeremy; Gillmor Kahn et al., filed Aug. 7, 2018.

Co-pending U.S. Appl. No. 16/121,393, inventors Zhou; Zheng et al., filed Sep. 4, 2018.

Co-pending U.S. Appl. No. 16/168,536, inventors Dumolin; Benoit F. et al., filed Oct. 23, 2018.

Co-pending U.S. Appl. No. 16/183,650, inventors Xiaohu; Liu et al., filed Nov. 7, 2018.

Co-pending U.S. Appl.No. 16/264,173, inventors Ashwini; Challa et al., filed Jan. 31, 2019.

Co-pending U.S. Appl. No. 16/376,832, inventors Liu; Honglei et al., filed Apr. 5, 2019.

Co-pending U.S. Appl. No. 16/389,738, inventors Peng; Fuchun et al., filed Apr. 19, 2019.

Co-pending U.S. Appl. No. 16/434,010, inventors Dogaru; Sergiu et al., filed Jun. 6, 2019.

Co-pending U.S. Appl. No. 16/659,070, inventors Lisa; Xiaoyi Huang et al., filed Oct. 21, 2019.

Co-pending U.S. Appl. No. 16/659,203, inventors Huang; Lisa Xiaoyi et al., filed Oct. 21, 2019.

Co-pending U.S. Appl. No. 16/742,769, inventors Xiaohu; Liu et al., filed Jan. 14, 2020.

Co-pending U.S. Appl. No. 16/790,497, inventors Gao; Yang et al., filed Feb. 13, 2020.

Co-pending U.S. Appl. No. 16/815,960, inventors Kshitiz; Malik et al., filed Mar. 11, 2020.

Co-pending U.S. Appl. No. 17/009,542, inventor Satwik; Kottur, filed Sep. 1, 2020.

Co-pending U.S. Appl. No. 17/139,363, inventors Daniel; Manhon Cheng et al., filed Dec. 31, 2020.

Co-pending U.S. Appl. No. 17/186,459, inventors Liu; Bing et al., filed Feb. 26, 2021.

Co-pending U.S. Appl. No. 17/336,716, inventors Chaland; Christophe et al., filed Jun. 2, 2021.

Co-pending U.S. Appl. No. 17/391,765, inventors Pu; Yiming et al., filed Aug. 2, 2021.

Co-pending U.S. Appl. No. 17/394,096, inventors Wang; Emily et al., filed Aug. 4, 2021.

Co-pending U.S. Appl. No. 17/394,159, inventors Santoro; Elizabeth Kelsey et al., filed Aug. 4, 2021.

Co-pending U.S. Appl. No. 17/407,922, inventors Pu; Yiming et al., filed Aug. 20, 2021.

Co-pending U.S. Appl. No. 17/504,276, inventors Satwik; Kottur et al., filed Oct. 18, 2021.

Co-pending U.S. Appl. No. 17/512,478, inventors Chen; Zhiyu et al., filed Oct. 27, 2021.

Co-pending U.S. Appl. No. 17/521,623, inventors Martinson; Leif Haven et al., filed Nov. 8, 2021.

Co-pending U.S. Appl. No. 17/525,510, inventors Akshat Shrivastava et al., filed Nov. 12, 2021.

Co-pending U.S. Appl. No. 17/543,178, inventors Desai; Shrey et al., filed Dec. 6, 2021.

Co-pending U.S. Appl. No. 17/566,467, inventors Goel; Swati et al., filed Dec. 30, 2021.

Co-pending U.S. Appl. No. 17/725,540, inventors Surkov; Alexey Gennadyevich et al., filed Apr. 20, 2022.

Co-pending U.S. Appl. No. 17/732,104, inventors Sheng; Bi et al., filed Apr. 28, 2022.

Co-pending U.S. Appl. No. 17/747,345, inventors Shrey; Desai et al., filed May 18, 2022.

Co-pending U.S. Appl. No. 17/877,568, inventor Mokhtar; Mohamed Khorshid, filed Jul. 29, 2022.

Co-pending U.S. Appl. No. 17/877,595, inventors Khorshid; Mokhtar Mohamed et al., filed Jul. 29, 2022.

Co-pending U.S. Appl. No. 17/934,898, inventor Katherina; Nguyen, filed Sep. 23, 2022.

Co-pending U.S. Appl. No. 17/935,029, inventors Shi; Yangyang et al., filed Sep. 23, 2022.

Co-pending U.S. Appl. No. 18/050,038, inventors Jackson; Aaron et al., filed Oct. 26, 2022.

Co-pending U.S. Appl. No. 18/050,039, inventors Yang; Fang-Yu et al., filed Oct. 26, 2022.

Co-pending U.S. Appl. No. 18/050,041, inventors Greenberg; Michael et al., filed Oct. 26, 2022.

Co-pending U.S. Appl. No. 18/055,591, inventors Corinna; Sherman Lu et al., filed Nov. 15, 2022.

Co-pending U.S. Appl. No. 18/059,641, inventors Liu; Shusen et al., filed Nov. 29, 2022.

(56)           References Cited

OTHER PUBLICATIONS

Co-pending U.S. Appl. No. 18/061,838, inventors Shervin; Ghasemlou et al., filed Dec. 5, 2022.
Co-pending U.S. Appl. No. 18/149,289, inventor Jiayang; Xu, filed Jan. 3, 2023.
Co-pending U.S. Appl. No. 18/152,064, inventors Satwik; Kottur et al., filed Jan. 9, 2023.
Co-pending U.S. Appl. No. 18/171,118, inventors Julien; Philippe Gilbert Odent et al., filed Feb. 17, 2023.
Co-pending U.S. Appl. No. 18/183,816, inventors Rongzhou; Shen et al., filed Mar. 14, 2023.

* cited by examiner

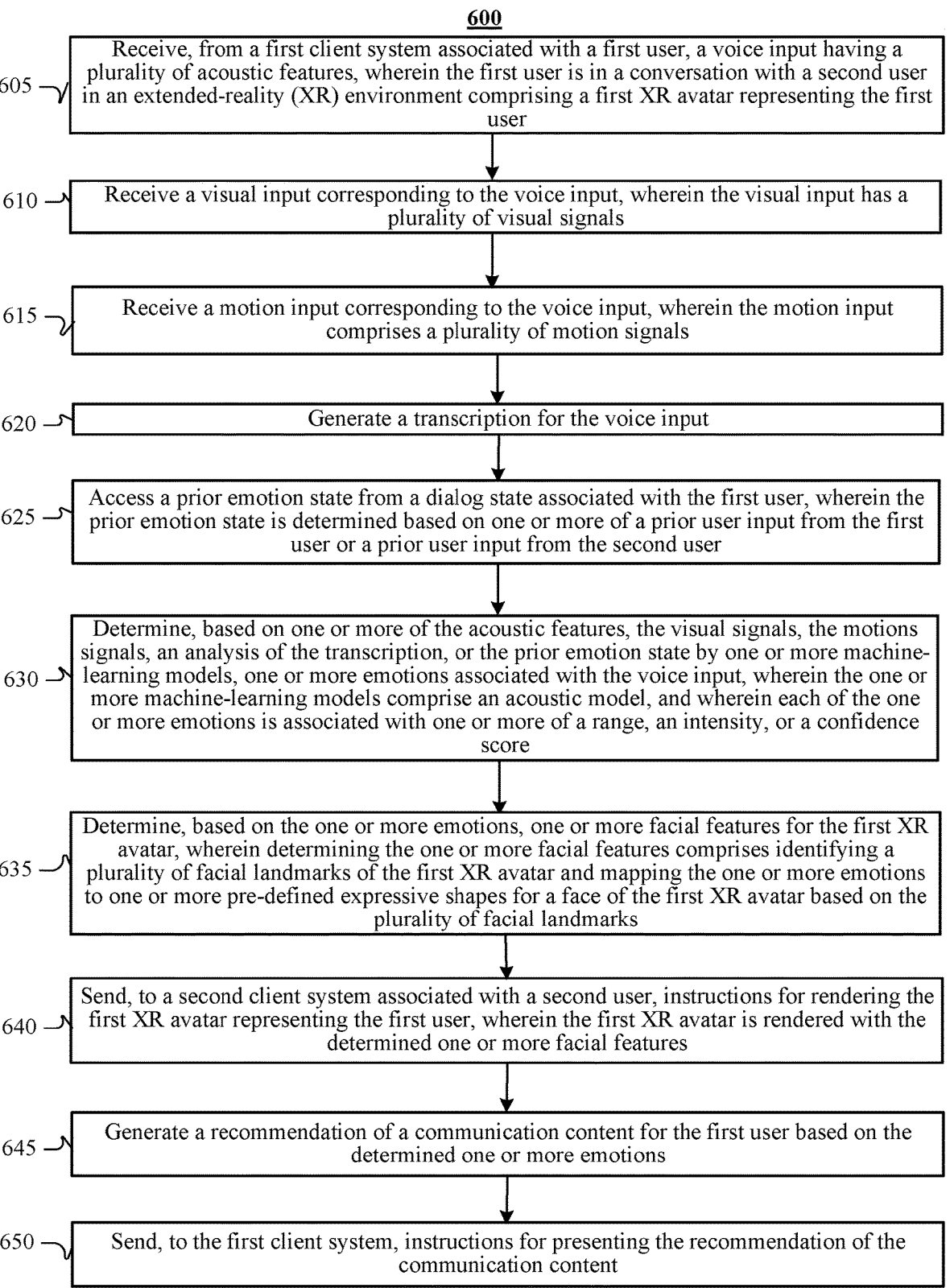

600

605 — Receive, from a first client system associated with a first user, a voice input having a plurality of acoustic features, wherein the first user is in a conversation with a second user in an extended-reality (XR) environment comprising a first XR avatar representing the first user 610 — Receive a visual input corresponding to the voice input, wherein the visual input has a plurality of visual signals 615 — Receive a motion input corresponding to the voice input, wherein the motion input comprises a plurality of motion signals 620 — Generate a transcription for the voice input 625 — Access a prior emotion state from a dialog state associated with the first user, wherein the prior emotion state is determined based on one or more of a prior user input from the first user or a prior user input from the second user 630 — Determine, based on one or more of the acoustic features, the visual signals, the motions signals, an analysis of the transcription, or the prior emotion state by one or more machine-learning models, one or more emotions associated with the voice input, wherein the one or more machine-learning models comprise an acoustic model, and wherein each of the one or more emotions is associated with one or more of a range, an intensity, or a confidence score 635 — Determine, based on the one or more emotions, one or more facial features for the first XR avatar, wherein determining the one or more facial features comprises identifying a plurality of facial landmarks of the first XR avatar and mapping the one or more emotions to one or more pre-defined expressive shapes for a face of the first XR avatar based on the plurality of facial landmarks 640 — Send, to a second client system associated with a second user, instructions for rendering the first XR avatar representing the first user, wherein the first XR avatar is rendered with the determined one or more facial features 645 — Generate a recommendation of a communication content for the first user based on the determined one or more emotions 650 — Send, to the first client system, instructions for presenting the recommendation of the communication content

*FIG. 6*

RENDERING XR AVATARS BASED ON ACOUSTICAL FEATURES

TECHNICAL FIELD

This disclosure generally relates to databases and file management within network environments, and in particular relates to hardware and software for extended-reality systems.

BACKGROUND

Extended reality (or artificial reality) is a form of reality that has been adjusted in some manner before presentation to a user, which may include, e.g., a virtual reality (VR), an augmented reality (AR), a mixed reality (MR), a hybrid reality, or some combination and/or derivatives thereof. Extended-reality content may include completely generated content or generated content combined with captured content (e.g., real-world photographs). The extended-reality content may include video, audio, haptic feedback, or some combination thereof, any of which may be presented in a single channel or in multiple channels (such as stereo video that produces a three-dimensional effect to the viewer). Extended reality may be associated with applications, products, accessories, services, or some combination thereof, that are, e.g., used to create content in an extended-reality environment and/or used in (e.g., perform activities in) an extended-reality environment. The extended-reality reality system that provides the extended-reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, an extended-reality (XR) system may provide users with a variety of unique experiences, from exploring both real world and metaverse, improving productivity, and enhancing real-time collaboration with colleagues to hanging out with friends and family to new types of games and interactive apps. The XR system may not only fully immerses a user in a digital environment, but also gives the user freedom to move around and interact with people and objects in their physical space while enjoying virtual content, unlocking a new class of AR-like experiences in VR that augment their physical space. In particular embodiments, the XR system may blend the virtual and physical worlds. The XR system may digitally reconstruct a user's physical space as a 3D space with an understanding of the objects and surfaces around the user. The XR system may utilize a variety of hardware and software technologies such as high-resolution sensors and AI-powered scene understanding. The XR system may transform a deep understanding of how users perceive the world around them and connect that perception to immersive experiences that excite users about the possibilities of virtual reality, augmented reality, and mixed reality. Although this disclosure describes particular XR systems in a particular manner, this disclosure contemplates any suitable XR system in any suitable manner.

In particular embodiments, an extended-reality (XR) system may detect emotions in voice conversations based on acoustic signals in real time for a variety of use cases. As an example and not by way of limitation, the XR system may support expressive interactions via avatars, augmented calling, and smart communication by identifying the underlying emotion in a speaker's voice. In particular embodiments, the XR system may respect the privacy of the parties involved and enable authentic, inclusive, and appropriate virtual self-expression. In addition, the XR system may support action-oriented expression, because it may not have to rely on a camera or a user to emote. The experiments on public benchmark datasets demonstrate the promise of the embodiments disclosed herein for supporting various use cases. Although this disclosure describes detecting emotions for particular uses cases by particular systems in a particular manner, this disclosure contemplates detecting emotions for any suitable use case by any suitable system (e.g., an assistant system) in any suitable manner.

In particular embodiments, the XR system may receive, from a first client system associated with a first user, a voice input having a plurality of acoustic features. The XR system may then determine, based on one or more of the acoustic features by one or more machine-learning models, one or more emotions associated with the voice input. The XR system may then determine, based on the one or more emotions, one or more facial features for a first extended-reality (XR) avatar representing the first user. In particular embodiments, the XR system may further send, to a second client system associated with a second user, instructions for rendering the first XR avatar representing the first user. The first XR avatar may be rendered with the determined one or more facial features.

Certain technical challenges exist for delivering real-time avatar expressivity. One technical challenge may include limiting computation, model size, and latency for on-device implementation and improved user experience. The solution presented by the embodiments disclosed herein to address this challenge may be using an end-to-end emotion-detection model that takes the user input and outputs emotion classifications in one shot, which may be helpful for reducing the computation, model size, and latency. Another technical challenge may include effectively detecting emotions in speech. The solution presented by the embodiments disclosed herein to address this challenge may be using one or more acoustic models (e.g., including an acoustic model based on Mel-scale spectrograms of audio signals) as they may be useful for harnessing the patterns of prosody, intonation, and stress in the speech for emotion detection.

Certain embodiments disclosed herein may provide one or more technical advantages. A technical advantage of the embodiments may include improved accuracy for emotion detection as the assistant system 140 may only use an acoustic model to detect emotions directly from audio signals without using ASR models to avoid compounding errors being introduced by the ASR models when they generate inaccurate transcriptions. Another technical advantage of the embodiments may include improved user experience as the assistant system may use detected emotions in the user's speech to adapt assistant services to reflect such emotions. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 illustrates an example method for delivering real-time avatar expressivity.

DESCRIPTION OF EXAMPLE EMBODIMENTS

System Overview

Figure 1:
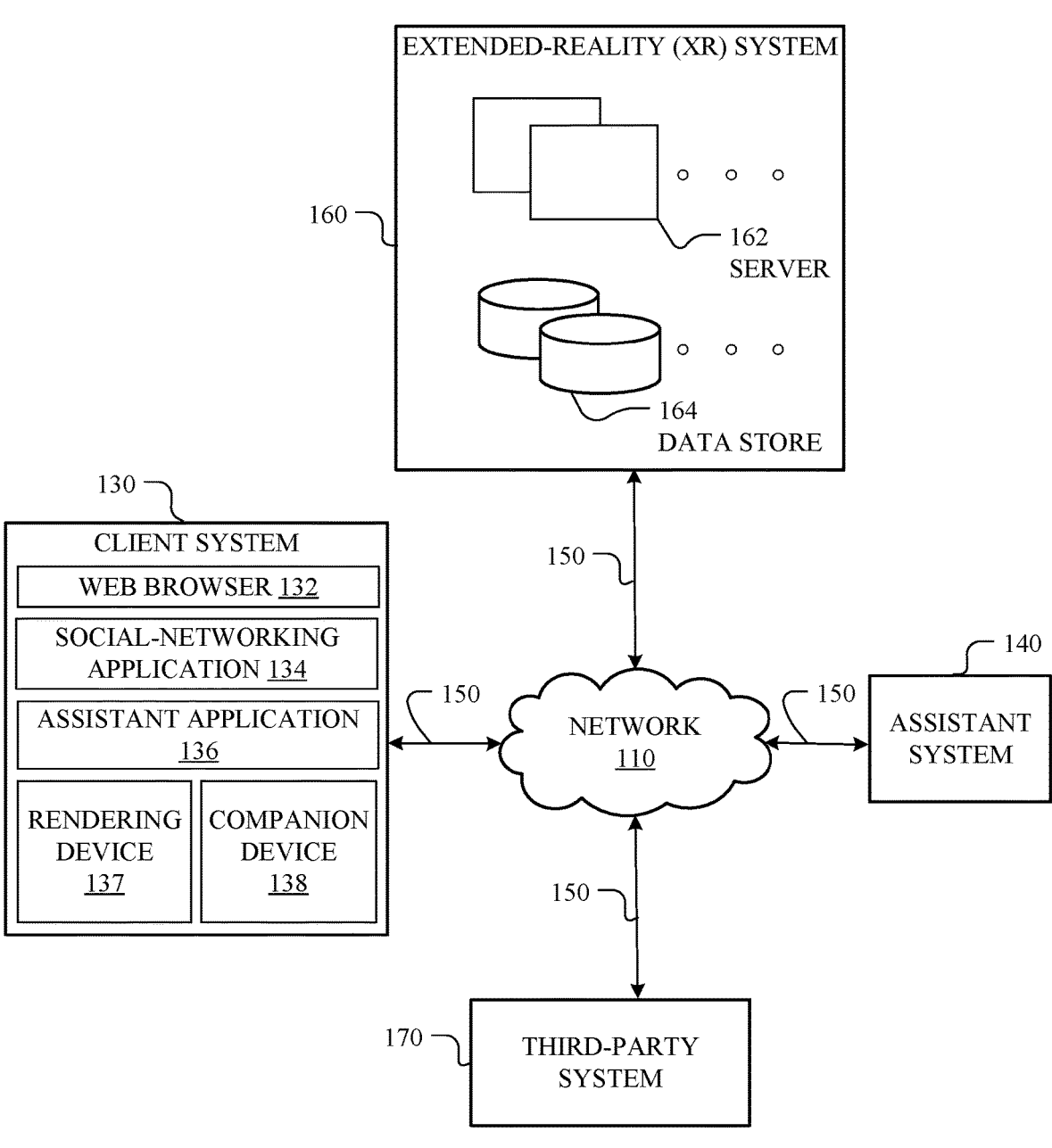
FIG. 1 illustrates an example network environment associated with an assistant system.

FIG. 1 illustrates an example network environment 100 associated with an extended-reality system. Network environment 100 includes a client system 130, an assistant system 140, an extended-reality (XR) system 160, and a third-party system 170 connected to each other by a network 110. Although FIG. 1 illustrates a particular arrangement of a client system 130, an assistant system 140, an extended-reality system 160, a third-party system 170, and a network 110, this disclosure contemplates any suitable arrangement of a client system 130, an assistant system 140, an extended-reality system 160, a third-party system 170, and a network 110. As an example and not by way of limitation, two or more of a client system 130, an extended-reality system 160, an assistant system 140, and a third-party system 170 may be connected to each other directly, bypassing a network 110. As another example, two or more of a client system 130, an assistant system 140, an extended-reality system 160, and a third-party system 170 may be physically or logically co-located with each other in whole or in part. Moreover, although FIG. 1 illustrates a particular number of client systems 130, assistant systems 140, extended-reality systems 160, third-party systems 170, and networks 110, this disclosure contemplates any suitable number of client systems 130, assistant systems 140, extended-reality systems 160, third-party systems 170, and networks 110. As an example and not by way of limitation, network environment 100 may include multiple client systems 130, assistant systems 140, extended-reality systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another network 110, or a combination of two or more such networks 110.

Links 150 may connect a client system 130, an assistant system 140, an extended-reality system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be any suitable electronic device including hardware, software, or embedded logic components, or a combination of two or more such components, and may be capable of carrying out the functionalities implemented or supported by a client system 130. As an example and not by way of limitation, the client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, smart watch, smart glasses, augmented-reality (AR) smart glasses, virtual reality (VR) headset, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design Pat. application Ser. No. 29/631,910, filed 3 Jan. 2018, U.S. Design Pat. application Ser. No. 29/631, 747, filed 2 Jan. 2018, U.S. Design Pat. application Ser. No. 29/631,913, filed 3 Jan. 2018, and U.S. Design Pat. application Ser. No. 29/631,914, filed 3 Jan. 2018, each of which is incorporated by reference. This disclosure contemplates any suitable client systems 130. In particular embodiments, a client system 130 may enable a network user at a client system 130 to access a network 110. The client system 130 may also enable the user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may include an assistant xbot functionality as a front-end interface for interacting with the user of the client system 130, including receiving user inputs and presenting outputs. In particular embodiments, the assistant xbot may be a type of chat bot. The assistant xbot may comprise a programmable service channel, which may be a software code, logic, or routine that functions as a personal assistant to the user. The assistant xbot may work as the user's portal to the assistant system 140. The assistant xbot may therefore be considered as a type of conversational agent. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be also part of the assistant system 140. In particular embodiments, the assistant application 136 may be accessed via the web browser 132. In particular embodiments, the user may interact with the assistant system 140 by providing user input to the assistant application 136 via various modalities (e.g., audio, voice, text, vision, image, video, gesture, motion, activity, location, orientation). The assistant application 136 may communicate the user input to the assistant system 140 (e.g., via the assistant xbot). Based on the user input, the assistant system 140 may generate responses. The assistant system 140 may send the generated responses to the assistant application 136. The assistant application 136 may then present the responses to the user at the client system 130 via various modalities (e.g., audio, text, image, and video). As an example and not by way of limitation, the user may interact with the assistant system 140 by providing a user input (e.g., a verbal request for information regarding a current status of nearby vehicle traffic) to the assistant xbot via a microphone of the client system 130. The assistant application 136 may then communicate the user input to the assistant system 140 over network 110. The assistant system 140 may accordingly analyze the user input, generate a response based on the analysis of the user input (e.g., vehicle traffic information obtained from a third-party source), and communicate the generated response back to the assistant application 136. The assistant application 136 may then present the generated response to the user in any suitable manner (e.g., displaying a text-based push notification and/or image(s) illustrating a local map of nearby vehicle traffic on a display of the client system 130).

In particular embodiments, a client system 130 may implement wake-word detection techniques to allow users to conveniently activate the assistant system 140 using one or more wake-words associated with assistant system 140. As an example and not by way of limitation, the system audio API on client system 130 may continuously monitor user input comprising audio data (e.g., frames of voice data) received at the client system 130. In this example, a wake-word associated with the assistant system 140 may be the voice phrase "hey assistant." In this example, when the system audio API on client system 130 detects the voice phrase "hey assistant" in the monitored audio data, the assistant system 140 may be activated for subsequent interaction with the user. In alternative embodiments, similar detection techniques may be implemented to activate the assistant system 140 using particular non-audio user inputs associated with the assistant system 140. For example, the non-audio user inputs may be specific visual signals detected by a low-power sensor (e.g., camera) of client system 130. As an example and not by way of limitation, the visual signals may be a static image (e.g., barcode, QR code, universal product code (UPC)), a position of the user (e.g., the user's gaze towards client system 130), a user motion (e.g., the user pointing at an object), or any other suitable visual signal.

In particular embodiments, a client system 130 may include a rendering device 137 and, optionally, a companion device 138. The rendering device 137 may be configured to render outputs generated by the assistant system 140 to the user. The companion device 138 may be configured to perform computations associated with particular tasks (e.g., communications with the assistant system 140) locally (i.e., on-device) on the companion device 138 in particular circumstances (e.g., when the rendering device 137 is unable to perform said computations). In particular embodiments, the client system 130, the rendering device 137, and/or the companion device 138 may each be a suitable electronic device including hardware, software, or embedded logic components, or a combination of two or more such components, and may be capable of carrying out, individually or cooperatively, the functionalities implemented or supported by the client system 130 described herein. As an example and not by way of limitation, the client system 130, the rendering device 137, and/or the companion device 138 may each include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augmented-reality (AR) smart glasses, other suitable electronic device, or any suitable combination thereof. In particular embodiments, one or more of the client system 130, the rendering device 137, and the companion device 138 may operate as a smart assistant device. As an example and not by way of limitation, the rendering device 137 may comprise smart glasses and the companion device 138 may comprise a smart phone. As another example and not by way of limitation, the rendering device 137 may comprise a smart watch and the companion device 138 may comprise a smart phone. As yet another example and not by way of limitation, the rendering device 137 may comprise smart glasses and the companion device 138 may comprise a smart remote for the smart glasses. As yet another example and not by way of limitation, the rendering device 137 may comprise a VR/AR headset and the companion device 138 may comprise a smart phone.

In particular embodiments, a user may interact with the assistant system 140 using the rendering device 137 or the companion device 138, individually or in combination. In particular embodiments, one or more of the client system 130, the rendering device 137, and the companion device 138 may implement a multi-stage wake-word detection model to enable users to conveniently activate the assistant system 140 by continuously monitoring for one or more wake-words associated with assistant system 140. At a first stage of the wake-word detection model, the rendering device 137 may receive audio user input (e.g., frames of voice data). If a wireless connection between the rendering device 137 and the companion device 138 is available, the application on the rendering device 137 may communicate the received audio user input to the companion application on the companion device 138 via the wireless connection. At a second stage of the wake-word detection model, the companion application on the companion device 138 may process the received audio user input to detect a wake-word associated with the assistant system 140. The companion application on the companion device 138 may then communicate the detected wake-word to a server associated with the assistant system 140 via wireless network 110. At a third stage of the wake-word detection model, the server associated with the assistant system 140 may perform a keyword verification on the detected wake-word to verify whether the user intended to activate and receive assistance from the assistant system 140. In alternative embodiments, any of the processing, detection, or keyword verification may be performed by the rendering device 137 and/or the companion device 138. In particular embodiments, when the assistant system 140 has been activated by the user, an application on the rendering device 137 may be configured to receive user input from the user, and a companion application on the companion device 138 may be configured to handle user inputs (e.g., user requests) received by the application on the rendering device 137. In particular embodiments, the rendering device 137 and the companion device 138 may be associated with each other (i.e., paired) via one or more wireless communication protocols (e.g., Bluetooth).

The following example workflow illustrates how a rendering device 137 and a companion device 138 may handle a user input provided by a user. In this example, an application on the rendering device 137 may receive a user input comprising a user request directed to the rendering device 137. The application on the rendering device 137 may then determine a status of a wireless connection (i.e., tethering status) between the rendering device 137 and the companion device 138. If a wireless connection between the rendering device 137 and the companion device 138 is not available, the application on the rendering device 137 may communicate the user request (optionally including additional data and/or contextual information available to the rendering device 137) to the assistant system 140 via the network 110. The assistant system 140 may then generate a response to the user request and communicate the generated response back to the rendering device 137. The rendering device 137 may then present the response to the user in any suitable manner. Alternatively, if a wireless connection between the rendering device 137 and the companion device 138 is available, the application on the rendering device 137 may communicate the user request (optionally including additional data and/or contextual information available to the rendering device 137) to the companion application on the companion device 138 via the wireless connection. The companion application on the companion device 138 may then communicate the user request (optionally including additional data and/or contextual information available to the companion device 138) to the assistant system 140 via the network 110. The assistant system 140 may then generate a response to the user request and communicate the generated response back to the companion device 138. The companion application on the companion device 138 may then communicate the generated response to the application on the rendering device 137. The rendering device 137 may then present the response to the user in any suitable manner. In the preceding example workflow, the rendering device 137 and the companion device 138 may each perform one or more computations and/or processes at each respective step of the workflow. In particular embodiments, performance of the computations and/or processes disclosed herein may be adaptively switched between the rendering device 137 and the companion device 138 based at least in part on a device state of the rendering device 137 and/or the companion device 138, a task associated with the user input, and/or one or more additional factors. As an example and not by way of limitation, one factor may be signal strength of the wireless connection between the rendering device 137 and the companion device 138. For example, if the signal strength of the wireless connection between the rendering device 137 and the companion device 138 is strong, the computations and processes may be adaptively switched to be substantially performed by the companion device 138 in order to, for example, benefit from the greater processing power of the CPU of the companion device 138. Alternatively, if the signal strength of the wireless connection between rendering device 137 and the companion device 138 is weak, the computations and processes may be adaptively switched to be substantially performed by the rendering device 137 in a standalone manner. In particular embodiments, if the client system 130 does not comprise a companion device 138, the aforementioned computations and processes may be performed solely by the rendering device 137 in a standalone manner.

In particular embodiments, an assistant system 140 may assist users with various assistant-related tasks. The assistant system 140 may interact with the extended-reality system 160 and/or the third-party system 170 when executing these assistant-related tasks.

In particular embodiments, the extended-reality system 160 may be a network-addressable computing system that can host an online social network. The extended-reality system 160 may generate, store, receive, and send social-networking data, such as, for example, user profile data, concept-profile data, social-graph information, or other suitable data related to the online social network. The extended-reality system 160 may be accessed by the other components of network environment 100 either directly or via a network 110. As an example and not by way of limitation, a client system 130 may access the extended-reality system 160 using a web browser 132 or a native application associated with the extended-reality system 160 (e.g., a mobile social-networking application, a messaging application, another suitable application, or any combination thereof) either directly or via a network 110. In particular embodiments, the extended-reality system 160 may include one or more servers 162. Each server 162 may be a unitary server or a distributed server spanning multiple computers or multiple datacenters. As an example and not by way of limitation, each server 162 may be a web server, a news server, a mail server, a message server, an advertising server, a file server, an application server, an exchange server, a database server, a proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the extended-reality system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, an extended-reality system 160, an assistant system 140, or a third-party system 170 to manage, retrieve, modify, add, or delete, the information stored in data store 164.

In particular embodiments, the extended-reality system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The extended-reality system 160 may provide users of the online social network the ability to communicate and interact with other users. In particular embodiments, users may join the online social network via the extended-reality system 160 and then add connections (e.g., relationships) to a number of other users of the extended-reality system 160 whom they want to be connected to. Herein, the term "friend" may refer to any other user of the extended-reality system 160 with whom a user has formed a connection, association, or relationship via the extended-reality system 160.

In particular embodiments, the extended-reality system 160 may provide users with the ability to take actions on various types of items or objects, supported by the extended-reality system 160. As an example and not by way of limitation, the items and objects may include groups or social networks to which users of the extended-reality system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the extended-reality system 160 or by an external system of a third-party system 170, which is separate from the extended-reality system 160 and coupled to the extended-reality system 160 via a network 110.

In particular embodiments, the extended-reality system 160 may be capable of linking a variety of entities. As an example and not by way of limitation, the extended-reality system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the extended-reality system 160. In particular embodiments, however, the extended-reality system 160 and third-party systems 170 may operate in conjunction with each other to provide social-networking services to users of the extended-reality system 160 or third-party systems 170. In this sense, the extended-reality system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the extended-reality system 160 also includes user-generated content objects, which may enhance a user's interactions with the extended-reality system 160. User-generated content may include anything a user can add, upload, send, or "post" to the extended-reality system 160. As an example and not by way of limitation, a user communicates posts to the extended-reality system 160 from a client system 130. Posts may include data such as status updates or other textual data, location information, photos, videos, links, music or other similar data or media. Content may also be added to the extended-reality system 160 by a third-party through a "communication channel," such as a newsfeed or stream.

In particular embodiments, the extended-reality system 160 may include a variety of servers, sub-systems, programs, modules, logs, and data stores. In particular embodiments, the extended-reality system 160 may include one or more of the following: a web server, action logger, API-request server, relevance-and-ranking engine, content-object classifier, notification controller, action log, third-party-content-object-exposure log, inference module, authorization/ privacy server, search module, advertisement-targeting module, user-interface module, user-profile store, connection store, third-party content store, or location store. The extended-reality system 160 may also include suitable components such as network interfaces, security mechanisms, load balancers, failover servers, management-and-network-operations consoles, other suitable components, or any suitable combination thereof. In particular embodiments, the extended-reality system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the extended-reality system 160 to one or more client systems 130 or one or more third-party systems 170 via a network 110. The web server may include a mail server or other messaging functionality for receiving and routing messages between the extended-reality system 160 and one or more client systems 130. An API-request server may allow, for example, an assistant system 140 or a third-party system 170 to access information from the extended-reality system 160 by calling one or more APIs. An action logger may be used to receive communications from a web server about a user's actions on or off the extended-reality system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a user input comprising a user request received from a client system 130. Authorization servers may be used to enforce one or more privacy settings of the users of the extended-reality system 160. A privacy setting of a user may determine how particular information associated with a user can be shared. The authorization server may allow users to opt in to or opt out of having their actions logged by the extended-reality system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Augmented-Reality Systems

Figure 2:
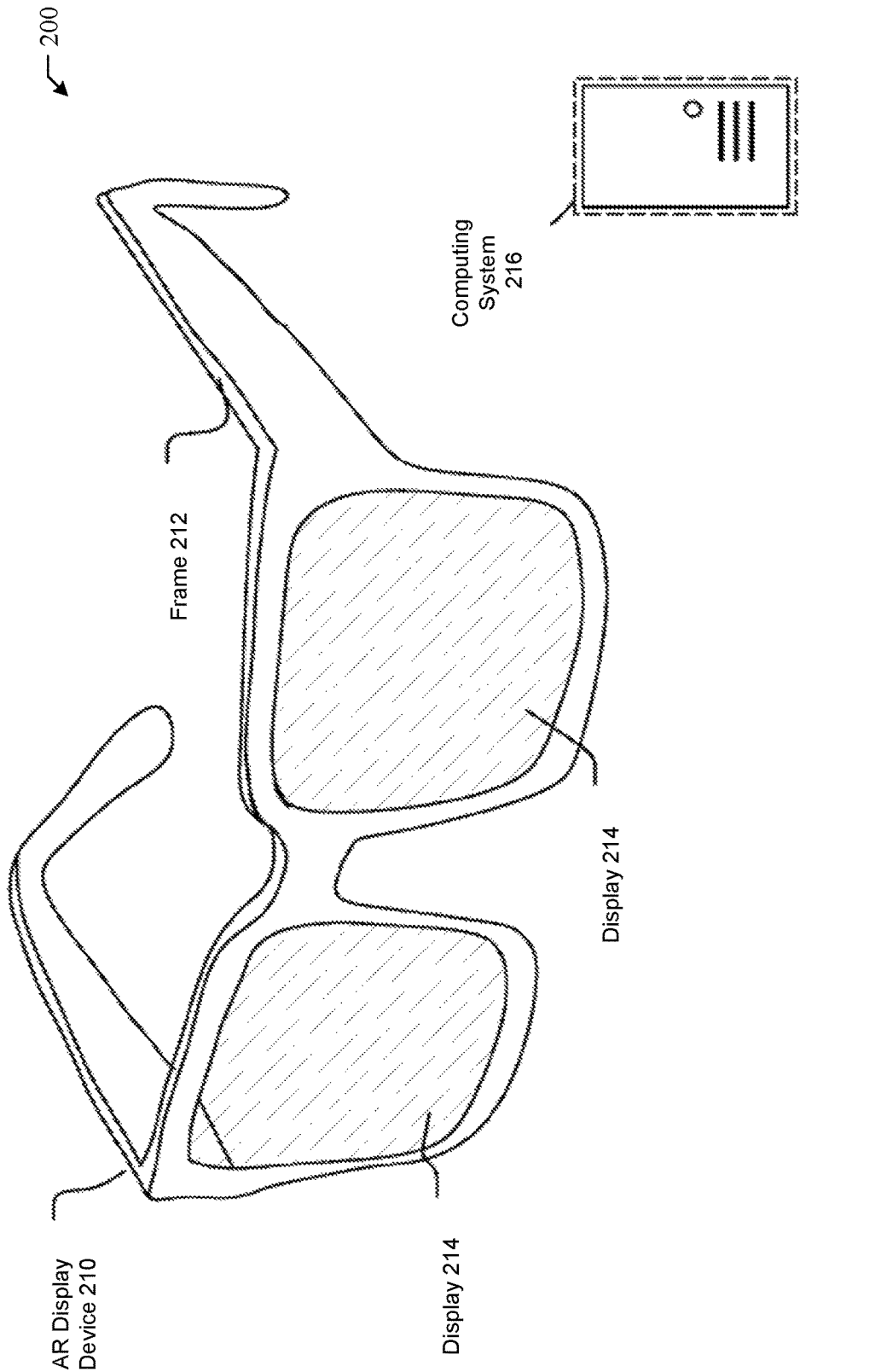
FIG. 2 illustrates an example augmented-reality system.

FIG. 2 illustrates an example augmented-reality (AR) system 200. In particular embodiments, the augmented-reality system 200 may perform one or more processes as described herein. The augmented-reality system 200 may include a head-mounted AR display device 210 (e.g., glasses) comprising a frame 212, one or more displays 214, and a computing system 216 (which may be, for example, a companion device 138). The displays 214 may be transparent or translucent, allowing a user wearing the AR display device 210 to look through the displays 214 to see the real-world environment and displaying visual artificial reality content to the user at the same time (for example, AR content objects may be rendered on the displays 214 to appear as overlaying the real-world environment). The AR display device 210 may include an audio device that may provide audio content to users. The AR display device 210 may include one or more cameras, which may capture images and videos of real-world environment. The AR display device 210 may include an eye-tracking system to track the vergence movement of the user wearing the AR display device 210. The AR display device 210 may include a microphone to capture voice input from the user. The augmented-reality system 200 may further include a controller comprising a trackpad and one or more buttons. The controller may receive inputs from users and relay the inputs to the computing system 216. The controller may also provide haptic feedback to users. The computing system 216 may be connected to the AR display device 210 and the controller through cables or wireless connections. The computing system 216 may control the AR display device 210 and the controller to provide the augmented-reality content to and receive inputs from users. The computing system 216 may be a standalone host computer device, an on-board computer device integrated with the AR display device 210, a mobile device, or any other hardware platform capable of providing augmented-reality content to and receiving inputs from users.

Object tracking within the image domain is a known technique. For example, a stationary camera may capture a video of a moving object, and a computing system may compute, for each frame, the 3D position of an object of interest or one of its observable features relative to the camera. When the camera is stationary, any change in the object's position is attributable only to the object's movement and/or jitter caused by the tracking algorithm. In this case, the motion of the tracked object could be temporally smoothed by simply applying a suitable averaging algorithm (e.g., averaging with an exponential temporal decay) to the current estimated position of the object and the previously estimated position(s) of the object.

Motion smoothing becomes much more complex in the context of augmented reality. For augmented-reality systems, an external-facing camera is often mounted on the HMD and, therefore, could be capturing a video of another moving object while moving with the user's head. When using such a non-stationary camera to track a moving object, the tracked positional changes of the object could be due to not only the object's movements but also the camera's movements. Therefore, the aforementioned method for temporally smoothing the tracked positions of the object would no longer work.

Virtual-Reality Systems

Figure 3:
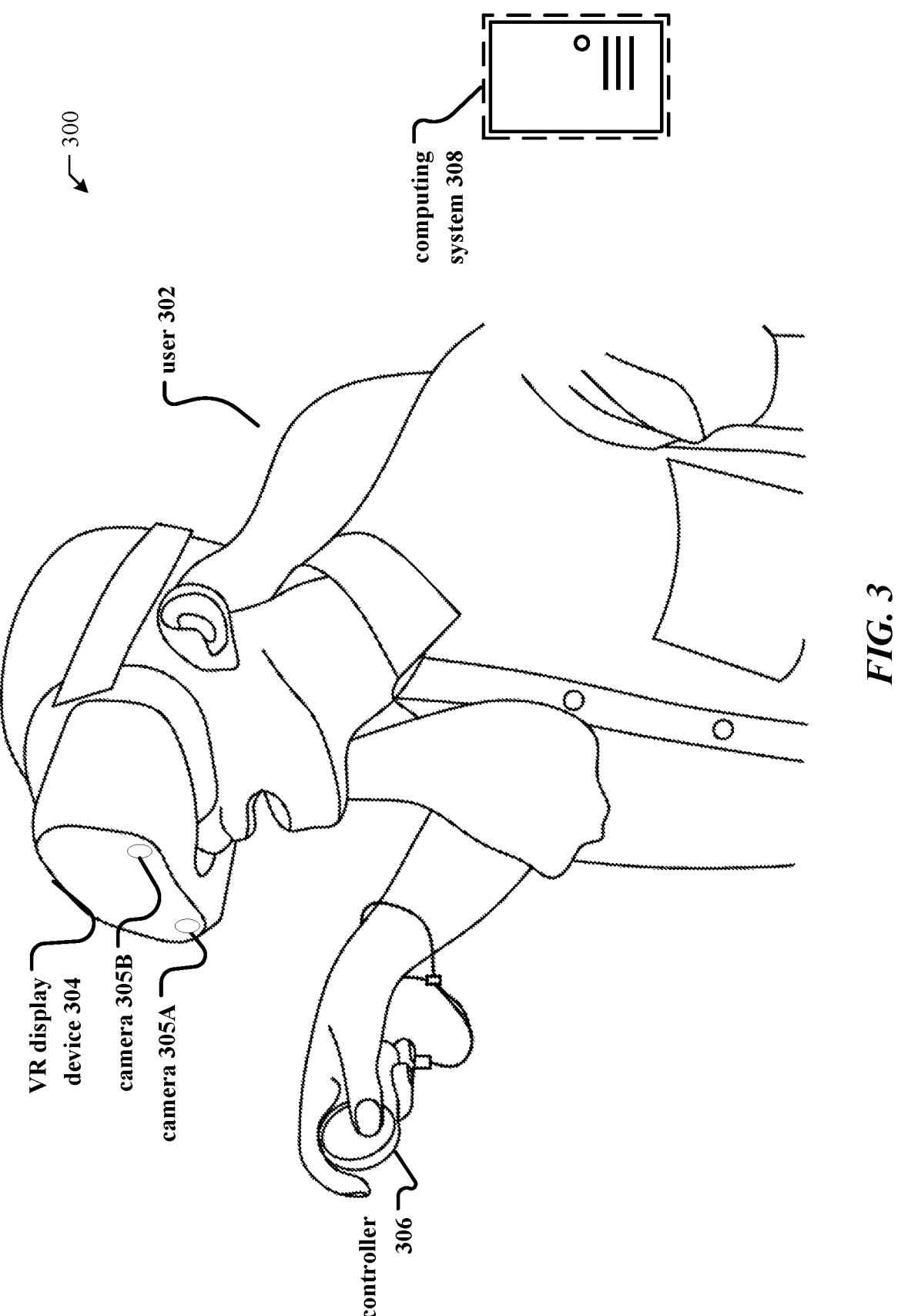
FIG. 3 illustrates an example of a virtual reality (VR) system worn by a user.

FIG. 3 illustrates an example of a virtual reality (VR) system 300 worn by a user 302. In particular embodiments, the VR system 300 may comprise a head-mounted VR display device 304, a controller 306, and one or more computing systems 308 (which may be, for example, companion devices 138). The VR display device 304 may be worn over the user's eyes and provide visual content to the user 302 through internal displays (not shown). The VR display device 304 may have two separate internal displays, one for each eye of the user 302 (single display devices are also possible). In particular embodiments, the VR display device 304 may comprise one or more external-facing cameras, such as the two forward-facing cameras 305A and 305B, which can capture images and videos of the real-world environment. The VR system 300 may further include one or more computing systems 308. The one or more computing systems 308 may be a stand-alone unit that is physically separate from the VR display device 304 or the computing systems 308 may be integrated with the VR display device 304. In embodiments where the one or more computing systems 308 are a separate unit, the one or more computing systems 308 may be communicatively coupled to the VR display device 304 via a wireless or wired link. The one or more computing systems 308 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a VR system 300 depends on the capabilities of its one or more computing systems 308.

Rendering XR Avatars Based on Acoustical Features

In particular embodiments, the XR system 160 may detect emotions in voice conversations based on acoustic signals in real time for a variety of use cases. As an example and not by way of limitation, the XR system 160 may support expressive interactions via avatars, augmented calling, and smart communication by identifying the underlying emotion in a speaker's voice. In particular embodiments, the XR system 160 may respect the privacy of the parties involved and enable authentic, inclusive, and appropriate virtual self-expression. In addition, the XR system 160 may support action-oriented expression, because it may not have to rely on a camera or a user to emote. The experiments on public benchmark datasets demonstrate the promise of the embodiments disclosed herein for supporting various use cases. Although this disclosure describes detecting emotions for particular uses cases by particular systems in a particular manner, this disclosure contemplates detecting emotions for any suitable use case by any suitable system (e.g., the assistant system 140) in any suitable manner.

In particular embodiments, the XR system 160 may receive, from a first client system 130 associated with a first user, a voice input having a plurality of acoustic features. The XR system 160 may then determine, based on one or more of the acoustic features by one or more machine-learning models, one or more emotions associated with the voice input. The XR system 160 may then determine, based on the one or more emotions, one or more facial features for a first extended-reality (XR) avatar representing the first user. In particular embodiments, the XR system 160 may further send, to a second client system 130 associated with a second user, instructions for rendering the first XR avatar representing the first user. The first XR avatar may be rendered with the determined one or more facial features. The first and second client systems 130 may be, for example, AR systems 200 or VR systems 300. In particular embodiments, the XR system 160 may also render more elaborate animations of the first XR avatar based on the detected emotions. As an example and not by way of limitation, if the first user says "congratulations," the XR system 160 may also render confetti and a pre-recorded congratulatory animation to make for a more delightful experience.

Irrespective of the modality of a communication, whether audio or video is available, there may always be an underlying conversation. A conversation may be a user-monologue, a dyadic exchange, or a multi-party dialog. A conversation may span across multiple dialog sessions between the same set of individuals or even be intertwined. Some conversations may be topic-focused, while others may be general chit-chat. Moreover, a conversation may be audio-only, text-only, or multi-modal, including audio and video of the speakers. (Note, however, the embodiments disclosed herein focus on conversations that include at least an audio component.) For a given conversation, the XR system 160 as a voice-interactive system may be able to detect the underlying emotion of the user from a predefined list of feelings such as happy, sad, angry, surprised, disgusted, etc. The detected emotions may be further used for a variety of use cases. In addition to the detected emotions, the XR system 160 may also detect the intensities of such emotions to appropriately fine-tune the rendering.

Some example use cases that emotion detection by the XR system 160 may be useful for are as follows. A primary use case may be avatar expressivity. In particular embodiments, the first user may be in a conversation with the second user in an XR environment comprising the first XR avatar. Avatars may be particularly related to virtual-reality (VR) devices. When users use VR devices immersing in metaverse with avatars representing them. With effective emotion detection, the XR system 160 may provide information of detected emotions to facilitate lively and expressive avatars to make interactions in the metaverse delightful, fun, and inclusive. Note that besides VR use cases, emotion detection by the XR system 160 may be equally applicable to avatars in augmented-reality (AR) use cases.

VR and AR devices may support face tracking. As such, expressive avatars may be possible with face tracking from user-facing cameras. But face tracking may not be feasible or comprehensive in some situations, limiting their usage to certain groups or situations. As an example and not by way of limitation, these situations may include more limited devices, user's face being occluded (e.g., the user is wearing a mask, the user has a beard, etc.), some emotions that cannot effectively be captured by facial analysis because they rely more on body language, etc. In these scenarios, the XR system 160 may use the audio features of the user's input to determine emotions.

In particular embodiments, the high-level steps to detect emotions for avatar expressivity may be outlined below. First, the XR system 160 may receive a user input. In general, the user input may be a speech input, assuming there is no visual signal of the user's facial features. Optionally, the XR system 160 may also access supplementary signals, such as the user's facial features (e.g., taken from cameras facing the user), gestures (e.g., from an electromyography (EMG) wristband or smartwatch). In particular embodiments, the XR system 160 may receive a visual input corresponding to the voice input. The visual input may have a plurality of visual signals. Accordingly, determining the one or more emotions may be further based on one or more of the visual signals. As an example and not by way of limitation, the visual input may capture a user's facial expression, which may be used to improve the emotion detection besides the voice input. In particular embodiments, the XR system 160 may receive a motion input corresponding to the voice input. The motion input may comprise a plurality of motion signals. Accordingly, determining the one or more emotions may be further based on one or more of the motion signals. As an example and not by way of limitation, the motion input may indicate the user's hands are moving quickly, which may be used together with the voice input to determine that the user is excited.

Next, the XR system 160 may use an emotion-detection model to perform feature transformation based on the speech input and analyze the emotions based on the features. In particular embodiments, the one or more machine-learning models may comprise an acoustic model. As a result, the embodiments disclosed herein may have a technical advantage of improved accuracy for emotion detection as the XR system 160 may only use an acoustic model to detect emotions directly from audio signals without using ASR models to avoid compounding errors being introduced by the ASR models when they generate inaccurate transcriptions.

In particular embodiments, the acoustic model may use spectrograms. A spectrogram is a visual representation of a spectrum of frequencies over time that make up the input waveform. Digitally sampled data, in the time domain, may be broken up into chunks, which may usually overlap. Fourier transform may be applied to calculate the magnitude of the frequency spectrum for each chunk. Each chunk may then correspond to a vertical line in the image. In the case of speech signals, the spectrograms may be further partitioned into Mel-filter banks which are log-scaled frequency bands to represent the range of human hearing, resulting in Mel-spectrograms.

In particular embodiments, the XR system 160 may transform, by the acoustic model, the voice input to a Mel-scale spectrogram. Accordingly, determining the one or more emotions may be further based on the Mel-scale spectrogram. As an example and not by way of limitation, the emotion-detection model may use an acoustic model to take the user input, convert the audio signals to a Mel-scale spectrogram, and analyze just the audio signal features to derive emotions from an audio pattern analysis. In particular embodiments, the XR system 160 may apply convolutional neural networks (CNNs) followed by MLPs on two-dimensional (2D) spectrograms and Mel-spectrograms as input features.

In particular embodiments, the acoustic model may use cepstral coefficients derived from spectrogram. Cepstral coefficients are amplitudes of the spectrum of discrete cosine transforms of a list of log powers taken at each of the frequencies and treating this list as if it was the input signal. For Mel-spaced frequencies, they may be called Mel-frequency cepstral coefficients (MFCCs). For linearly spaced frequencies, they are linear frequency cepstral coefficients (LFCCs). MFCCs are commonly used in speech recognition. MFCCs have been used as an input to MLPs or shallow CNNs followed by MLPs for emotion recognition from speech. Using one or more acoustic models (e.g., including an acoustic model based on Mel-scale spectrograms of audio signals) may be an effective solution for addressing the technical challenge of effectively detecting emotions in speech as they may be useful for harnessing the patterns of prosody, intonation, and stress in the speech for emotion detection.

In alternative embodiments, the emotion-detection model may take the speech input and transcribe it to text (via the ASR module) and derive emotions based on the transcribed text using a linguistic model within the NLU module. In particular embodiments, the XR system 160 may generate a transcription for the voice input. Accordingly, determining the one or more emotions may be further based on an analysis of the transcription. As an example and not by way of limitation, the transcription may be " . . . This is unacceptable! . . . " which may indicate the user is angry. In particular embodiments, the linguistic model may utilize different types of contexts, implemented as masked attentions over previous utterances, to improve detection performance. As an example and not by way of limitation, these types of contexts may comprise global attention (all previous turns), speaker attention (turns belonging to the current speaker), and listener attention (turns belonging to the current listener). In particular embodiments, such conversational context may be applied to the acoustic model as well.

Besides these aforementioned approaches that include intermediate steps, the XR system 160 may also just have an end-to-end model that takes the user input and outputs emotion classifications in one shot without the intermediate steps. The XR system 160 may use such end-to-end model that goes straight from the user input to emotion rendering on the avatar. Using an end-to-end emotion-detection model may be an effective solution for addressing the technical challenge of limiting computation, model size, and latency for on-device implementation and improved user experience as the end-to-end model may take the user input and output emotion classifications in one shot, which may be helpful for reducing the computation, model size, and latency. In particular embodiments, the XR system 160 may merge the acoustic and linguistic models to simultaneously learn from prosody, intonation, and stress in the voice and also the content of the speech. Such a higher accuracy model may be beneficial for asynchronous tasks that utilize emotion as a context.

In particular embodiments, the acoustic model may be based on a deep-learning model. The output layer, i.e., the classification head, for deep learning models may comprise multi-layer perceptrons (MLPs). The differentiating factors may comprise the input representations to the classification head. The acoustic model may be based on the following variants.

In particular embodiments, the acoustic model may use raw audio signals. The raw waveform may be directly used for classification without any explicit feature transformation. The representation learning may happen within the model. As an example and not by way of limitation, a popular M5 model for waveform classification that consists of 5 convolutional layers culminating in a fully-connected layer for output may be used. The convolutional layer closest to the input may have the widest kernel size. The kernel size may decrease gradually towards the output layer.

In particular embodiments, the acoustic model may use encodings from a pre-trained speech model. As an example and not by way of limitation, Wav2Vec2 is a pre-trained speech model. The XR system 160 may use Wav2Vec2 as an encoder on the input waveform. An MLP may be then applied to the encodings for classification.

In particular embodiments, avatar expressivity applications may require on-device deployment of the emotion-detection model to enable real-time rendering and also to respect privacy considerations. Consequently, the XR system 160 may use those model architectures that are likely to be rapid, small, and able to work with the lightweight solutions to run deep-learning models (e.g., TensorFlow Lite interpreter) on device. All models reported below (except pretrained Wav2Vec2 encoder) are less than 6 MB deployed size.

The CNN models described below each have multiple levels of "convolution blocks", each consisting of convolution, pooling, batch-norm, and ReLU activation (in that order), followed by a few layers of "dense blocks", each consisting of fully connected linear layers with dropouts, and ReLU activation. Optimal number of levels of convolution and dense blocks were identified via hyperparameter tuning.

Table 2 depicts the performance comparison of various model and feature transformation variants on the RAVDESS dataset for 4 emotion categories (happy, sad, surprised, and neutral). Although this disclosure describes particular approaches using particular models for emotion detection in a particular manner, this disclosure contemplates any suitable approach using any suitable model for emotion detection in any suitable manner.

TABLE 2

Performance comparison of various model and feature transformation variants.

| Feature transforms + Model architecture | Accuracy of detection | Model size (Number of parameters) |
|---|---|---|
| Random (Stratified) (strawman baseline) | 0.2783 | NA |
| Most frequent category (strawman baseline) | 0.4362 | NA |
| Raw input + M5 | 0.6206 | 1.4M params |
| Spectrogram + CNN | 0.7333 | 1.1M params |
| Mel-Spectrogram + CNN | 0.7541 | 1.1M params |
| MFCC + CNN | 0.7324 | 1.1M params |
| LFCC + CNN | 0.7388 | 1.1M params |
| Mel-Spec & MFCC & LFCC (averaged over time) + MLP | 0.7513 | 776K params |
| Mel-Spectrogram + Light-Conv (no MLM pretraining) | 0.721 | 725K params |
| Mel-Spectrogram + MFCC + Light-Conv (no MLM pretraining) | 0.745 | 1.4M params |
| Raw input + Pretrained Wav2Vec2-Large + MLP (no fine tuning) with Mean pooling across layers | 0.705 | 264K trainable params + 315M frozen params |
| Raw input + Pretrained Wav2 Vec2-Large + MLP (no fine tuning and using last layer) | 0.702 | 264K trainable params + 315M frozen params |

In addition to the audio signals, the XR system 160 may use prior emotional state from prior inputs to further improve the accuracy. In particular embodiments, the prior emotional state may be stored in dialog state. In particular embodiments, the XR system 160 may access a prior emotion state from a dialog state associated with a first user. The prior emotion state may be determined based on one or more of a prior user input from the first user or a prior user input from the second user. Accordingly, determining the one or more emotions may be further based on the prior emotion state. As an example and not by way of limitation, the XR system 160 may infer a user's emotional states (e.g., in a happy emotional state) by tracking utterances of previous participants in the conversation and store these prior emotion states in the dialog state. The XR system 160 may further use the stored emotion state (e.g., happy) together with the current voice input to determine that the user is probably still happy.

In particular embodiments, the output of the emotion-detection model may include various emotion classifications. In addition, each of the one or more emotions may be associated with one or more of a range, an intensity, or a confidence score. In particular embodiments, the one or more emotions may be associated with one or more confidence scores, respectively. The XR system 160 may further rank the one or more emotions based on their confidence scores. Accordingly, determining the one or more facial features is based on a top-ranked emotion. In other words, the XR system 160 may take the emotion classification with the top confidence score and render the avatar expression based on that emotion.

In particular embodiments, the one or more emotions may be associated with one or more confidence scores, respectively. The XR system 160 may further rank the one or more emotions based on their confidence scores and select two or more of the ranked emotions based on their rankings. Accordingly, determining the one or more facial features may be based on the selected two or more emotions. In particular embodiments, the XR system 160 may generate a blended emotion based on the selected two or more emotions. Accordingly, determining the one or more facial features may be based on the blended emotion. In other words, the XR system 160 may take the top-N emotions and render a hybrid emotion (i.e., a blending of these top-N emotions) for the avatar. As an example and not by way of limitation, the top-2 emotions may include disappointed and sad. The XR system 160 may blend these two emotions and render the avatar accordingly.

In particular embodiments, the XR system 160 may further map the emotions to facial features (expressions, movements, etc.) of the avatar. In particular embodiments, determining the one or more facial features may comprise identifying a plurality of facial landmarks of the first XR avatar. Determining the one or more facial features may further comprise mapping the one or more emotions to one or more pre-defined expressive shapes for a face of the first XR avatar based on the plurality of facial landmarks. As a result, an animated avatar may be derived.

In particular embodiments, the XR system 160 may also have a lip-sync model that renders the avatar's lip movement based on the emotions. The XR system 160 may generate one or more lip movements using a lip-sync model based on the determined one or more emotions. Accordingly, the first XR avatar may be rendered further based on the one or more lip movements.

In particular embodiments, the XR system 160 may detect out-of-coverage emotions. The XR system 160 may predict from a predefined library of emotions. If the XR system 160 cannot determine from the predefined library of emotions, the XR system 160 may predict neutral as the emotion.

In particular embodiments, there may be animation constraints for avatar expressivity. As such, prediction span may be redefined based on animation constraints and expression dynamics. In particular embodiments, the XR system 160 may determine conflicting emotions. In this case, the XR system 160 may report identified emotions along with confidence scores, which may be mitigated based on the specific use case.

In particular embodiments, the XR system 160 may predict emotions at the shortest possible relevant span, e.g., word, phrase, sentence, or even paragraph. In particular embodiments, the XR system 160 may limit the detection and expression of emotions based on social norms and topic-sensitivity. In particular embodiments, the XR system 160 may perform early detection of emotions as people may emote before they speak. The XR system 160 may utilize contextual information for early detection. As an example and not by way of limitation, the contextual information may indicate that the user is shaking head slowly. The XR system 160 may then perform an early detection of disappointment.

In particular embodiments, the XR system 160 may detect implicit emotions. Humans may emote without speaking, based on other party's utterances. As such, the XR system 160 may model the emotion detection models based on emotions for all parties in a conversation. As an example and not by way of limitation, the other party's utterances may be aggressive, for which the XR system 160 may determine that the user is probably unhappy or irritated.

In particular embodiments, there may be a latency in avatar emotional rendering. In particular embodiments, the XR system 160 may determine whether a latency time for rendering the first XR avatar is greater than a threshold time. The XR system 160 may delay a transmission of one or more audio signals corresponding to the voice input to the second client system 130 by a delay time. In particular embodiments, the delay time may be determined based on the latency time. As an example and not by way of limitation, users usually don't notice changes that are less than 18 milliseconds (threshold time). Therefore, if the latency is less than 18 milliseconds, it may be not an issue. However, if the latency is more than 18 milliseconds, the XR system 160 may slightly delay the audio delivery to the other conversation participant(s) while the emotion is being analyzed/rendered. In particular embodiments, the XR system 160 may use an end-to-end model that takes the user input and outputs emotion classifications in one shot, which may be helpful for reducing the latency.

In particular embodiments, delivering avatar expressivity may require accurate emotion detection while limiting the delay in emotion detection after it has been manifested by the speaker. Longer audio segments may comprise more emotional information and may lead to more accurate detection. But beyond a certain duration, other irrelevant signals may drown out the emotional signal in the audio. Moreover, longer audio segments may require longer inference times and may use relatively less fresh audio. In addition, the expression may seem unsynchronized with the actual audio if the emotion is not expressed on the avatar immediately along with the audio that signaled that emotion.

Figure 4:
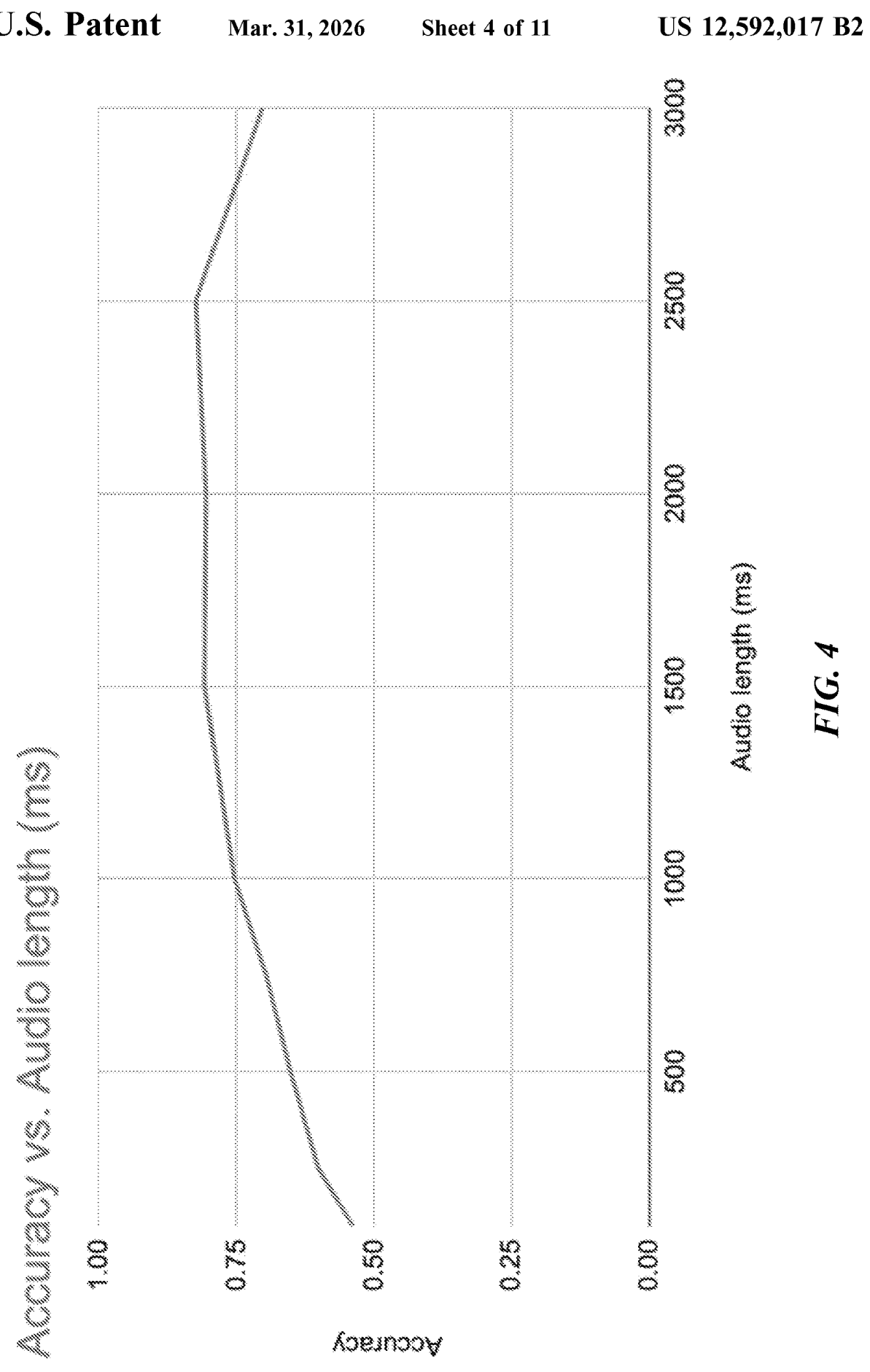
FIG. 4 illustrates an example trend of emotion detection accuracy to the length of the audio segment being used for inference.
Figure 5:
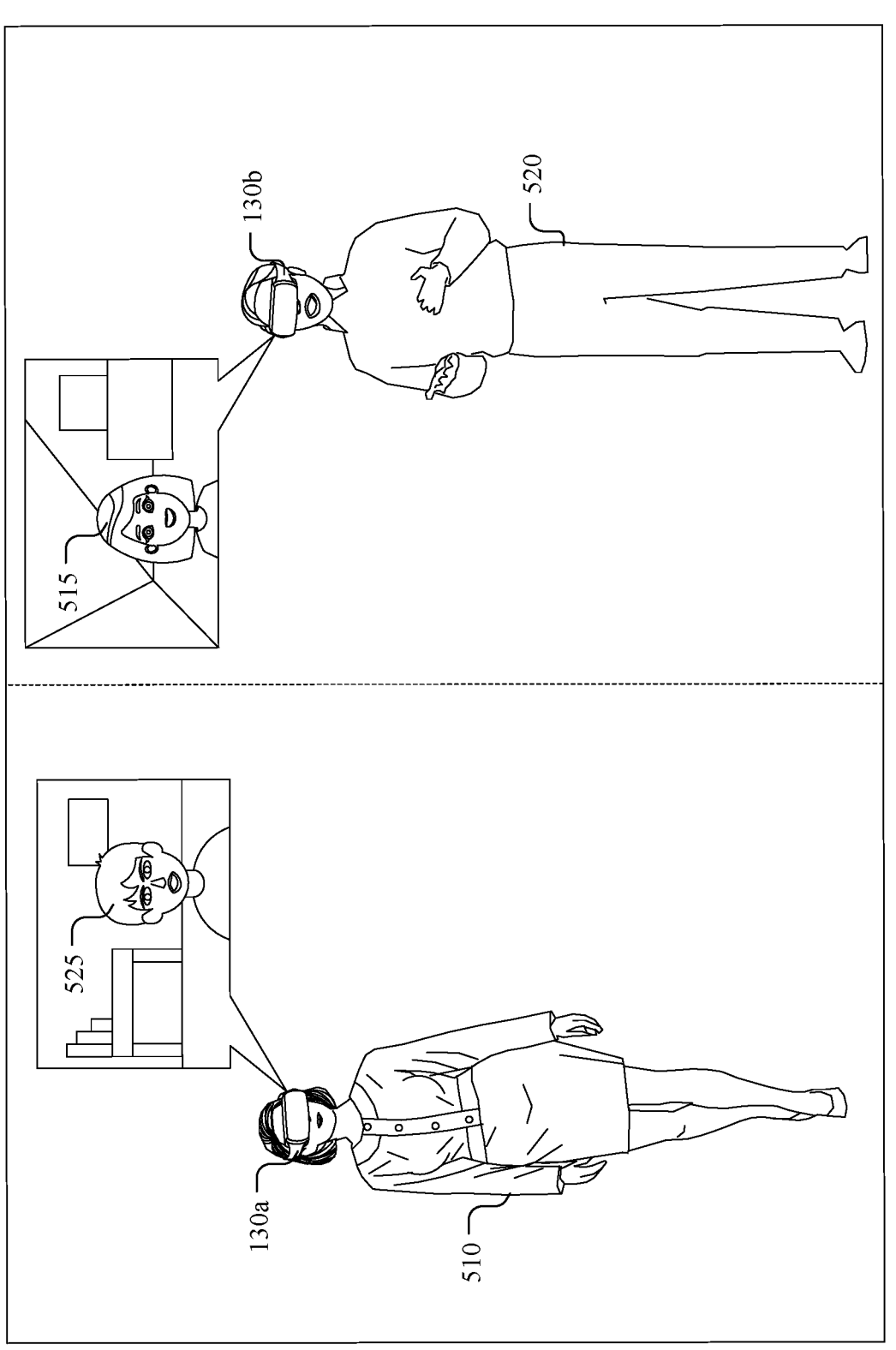
FIG. 5 illustrates an example user conversation represented by avatars.

To understand this tradeoff, the embodiments disclosed herein undertook experiments to identify an optimal tradeoff of classification performance. FIG. 4 illustrates an example trend of emotion detection accuracy to the length of the audio segment being used for inference. The results may be generated based on an example model based on CNN classifier over 2-dimensional Mel-spectrograms of the audio input. As illustrated in FIG. 5, although higher accuracy is possible between 1500 milliseconds to 2500 milliseconds, the resulting delay in expression rendering on the headsets was unacceptable when we tried using these models for expressivity. These current expressivity lag assessments were qualitative based on our manual judgment and discussions. In this disclosure, we have chosen to detect emotions on 1 second audio segments, performing such inferences every 150 milliseconds as the "emotion refresh rate" for rendering expressivity.

In particular embodiments, the XR system 160 may implement the emotion detection model as a zero-shot classifier using textual entailment based on a language model pre-trained on a public dataset. As an example and not by way of limitation, the language model may be BART, BERT, ROBERT, GPT, or LLAMA. Emotion detection may be achieved using a linguistic (text-based) model. The emotion detection may also be achieved using an acoustical-only model, which is quicker and efficient on computing resources. The acoustic-only model may not need to analyze the text outputted by the ASR module 208, but instead may analyze only the acoustic features of the input to determine the emotions of a speaker. Comprehensive experiments have been conducted on a plurality of publicly available datasets for quantitative analysis. Table 3 shows example predictions on some utterances without any task-specific fine-tuning. The experimental results are promising. The emotion-detection model may be also extended beyond zero-shot classification to incorporate longer contexts using an XLMR classifier trained for this specific task and state-of-the-art approaches for multi-party conversation.

TABLE 3

| Example predictions on some utterances without any task-specific fine-tuning. | |
| --- | --- |
| Utterance | Detected emotion |
| We bought a new car | Happy |
| We are having a baby | Excited |
| Our baby is down with fever | Sad |
| Merry Christmas | Happy |
| My phone is not working | Frustrated |
| We lost the game | Sad |
| This painting is beautiful | Surprised |
| Sacramento is the capital of California | Neutral |
| We had a bountiful harvest this year | Happy |
| We had a poor harvest this year | Sad |
| I will kick you | Angry |
| Chamomile tea is so soothing | Calm |

Besides avatar expressivity, the emotion-detection model may be applied to the following use cases. One use case may be augmented avatar calling. Augmented avatar calling is an alternative when holographic calling is infeasible due to unavailable visuals (e.g., when the user turns off their camera because they aren't comfortable). While viseme-based lip movement may be enabled based on audio, authentic expressions in avatar calling may be only possible through emotion-understanding from the conversation. Another use case may be ultra-low friction emotive reactions. The XR system 160 may improve the emotive reactions feature to accurately suggest quick emotive acknowledgements to incoming messages.

Another use case may be smart communications such as smart compose, smart replies, message summarization, notification summarization, auto-capture, and smart keyboard. Knowing the underlying emotion in a conversation may lead to better natural-language generation, emoji recommendations, and sticker/content recommendations. In particular embodiments, the XR system 160 may generate a recommendation of a communication content for the first user based on the determined one or more emotions. The XR system 160 may further send, to the first client system 130, instructions for presenting the recommendation of the communication content.

Another use case may be enriching responses from non-playing characters (NPCs) in games. The XR system 160 may offer a software development kit (SDK) to developers so that they may design their games to provide customized responses by NPCs in real-time based on the user's emotion.

Another use case may be for the XR system 160 itself. The assistant system 140 may act as a contextually intelligent assistant that gives people "superpowers" in a digitally augmented world. Emotions may be an important contextual personalization feature in conversational artificial-intelligence (AI) tasks involving natural language understanding, natural language generation, question and answering, proactive relevance, and summarization. In particular embodiments, the first client system 130 may send, to an XR system 160 executing on the first client system 130, the determined one or more emotions. The client system 130 may further receive, from the XR system 160, execution results of one or more tasks determined based on the one or more emotions. As a result, the embodiments disclosed herein may have a technical advantage of improved user experience as the XR system 160 may use detected emotions in the user's speech to adapt assistant services to reflect such emotions.

FIG. 5 illustrates an example user conversation represented by avatars. User 510 may be wearing a VR headset 130*a*. User 520 may be wearing a VR headset 130*b*. The two users may be having a conversation in the metaverse. As can be seen, each of the two users may see an avatar representing the other user. To be more specific, user 510 may see an avatar 525 representing user 520. User 520 may see an avatar 515 representing user 510. The XR system 160 may detect emotions of each user based on their respective voice input. The XR system 160 may further rendering the expressivity of the avatars accordingly. As an example and not by way of limitation, the XR system 160 may detect that user 510 is unhappy. Accordingly, the XR system 160 may render avatar 515 frowning. As another example and not by way of limitation, the XR system 160 may detect that user 520 is happy. Accordingly, the XR system 160 may render avatar 525 smiling.

FIG. 6 illustrates an example method 600 for delivering real-time avatar expressivity. The method may begin at step 605, where the XR system 160 may receive, from a first client system 130 associated with a first user, a voice input having a plurality of acoustic features, wherein the first user is in a conversation with a second user in an extended-reality (XR) environment comprising a first XR avatar representing the first user. At step 610, the XR system 160 may receive a visual input corresponding to the voice input, wherein the visual input has a plurality of visual signals. At step 615, the XR system 160 may receive a motion input corresponding to the voice input, wherein the motion input comprises a plurality of motion signals. At step 620, the XR system 160 may generate a transcription for the voice input. At step 625, the XR system 160 may access a prior emotion state from a dialog state associated with the first user, wherein the prior emotion state is determined based on one or more of a prior user input from the first user or a prior user input from the second user. At step 630, the XR system 160 may determine, based on one or more of the acoustic features, the visual signals, the motions signals, an analysis of the transcription, or the prior emotion state by one or more machine-learning models, one or more emotions associated with the voice input, wherein the one or more machine-learning models comprise an acoustic model, and wherein each of the one or more emotions is associated with one or more of a range, an intensity, or a confidence score. At step 635, the XR system 160 may determine, based on the one or more emotions, one or more facial features for the first XR avatar, wherein determining the one or more facial features comprises identifying a plurality of facial landmarks of the first XR avatar and mapping the one or more emotions to one or more pre-defined expressive shapes for a face of the first XR avatar based on the plurality of facial landmarks. At step 640, the XR system 160 may send, to a second client system 130 associated with a second user, instructions for rendering the first XR avatar representing the first user, wherein the first XR avatar is rendered with the determined one or more facial features. At step 645, the XR system 160 may generate a recommendation of a communication content for the first user based on the determined one or more emotions. At step 650, the XR system 160 may send, to the first client system 130, instructions for presenting the recommendation of the communication content. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for delivering real-time avatar expressivity including the particular steps of the method of FIG. 6, this disclosure contemplates any suitable method for delivering real-time avatar expressivity including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Assistant Systems

Figure 7:
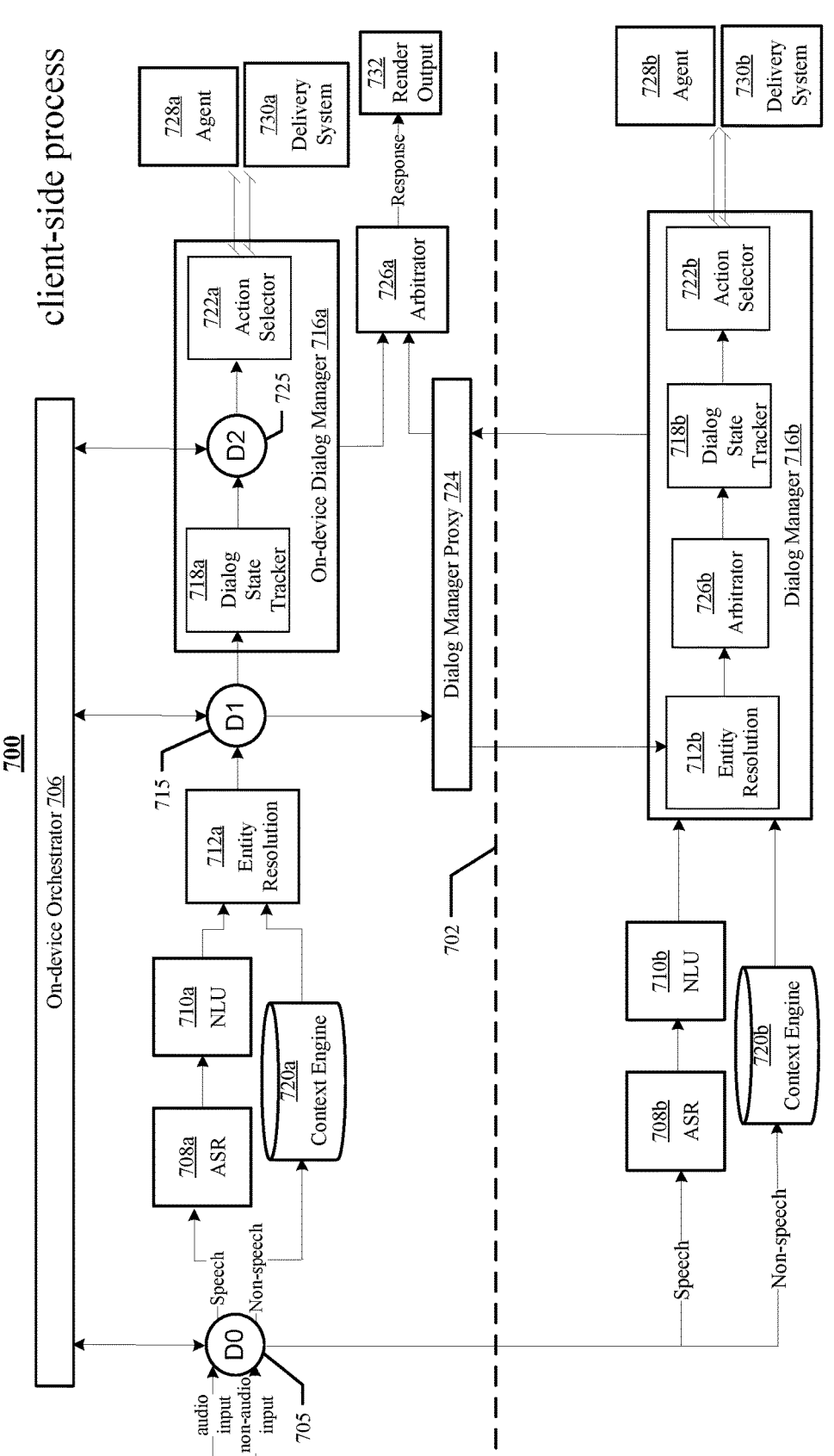
FIG. 7 illustrates an example architecture of the assistant system.

FIG. 7 illustrates an example architecture 700 of the assistant system. In particular embodiments, the assistant system 140 may assist a user to obtain information or services. The assistant system 140 may enable the user to interact with the assistant system 140 via user inputs of various modalities (e.g., audio, voice, text, vision, image, video, gesture, motion, activity, location, orientation) in stateful and multi-turn conversations to receive assistance from the assistant system 140. As an example and not by way of limitation, a user input may comprise an audio input based on the user's voice (e.g., a verbal command), which may be processed by a system audio API (application programming interface) on client system 130. The system audio API may perform techniques including echo cancellation, noise removal, beam forming, self-user voice activation, speaker identification, voice activity detection (VAD), and/or any other suitable acoustic technique in order to generate audio data that is readily processable by the assistant system 140. In particular embodiments, the assistant system 140 may support mono-modal inputs (e.g., only voice inputs), multi-modal inputs (e.g., voice inputs and text inputs), hybrid/multi-modal inputs, or any combination thereof. In particular embodiments, a user input may be a user-generated input that is sent to the assistant system 140 in a single turn. User inputs provided by a user may be associated with particular assistant-related tasks, and may include, for example, user requests (e.g., verbal requests for information or performance of an action), user interactions with the assistant application 136 associated with the assistant system 140 (e.g., selection of UI elements via touch or gesture), or any other type of suitable user input that may be detected and understood by the assistant system 140 (e.g., user movements detected by the client device 130 of the user).

In particular embodiments, the assistant system 140 may create and store a user profile comprising both personal and contextual information associated with the user. In particular embodiments, the assistant system 140 may analyze the user input using natural-language understanding (NLU) techniques. The analysis may be based at least in part on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation (NLG). Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist a user via an architecture built upon client-side processes and server-side processes which may operate in various operational modes. In FIG. 7, the client-side process is illustrated above the dashed line 702 whereas the server-side process is illustrated below the dashed line 702. A first operational mode (i.e., on-device mode) may be a workflow in which the assistant system 140 processes a user input and provides assistance to the user by primarily or exclusively performing client-side processes locally on the client system 130. For example, if the client system 130 is not connected to a network 110 (i.e., when client system 130 is offline), the assistant system 140 may handle a user input in the first operational mode utilizing only client-side processes. A second operational mode (i.e., cloud mode) may be a workflow in which the assistant system 140 processes a user input and provides assistance to the user by primarily or exclusively performing server-side processes on one or more remote servers (e.g., a server associated with assistant system 140). As illustrated in FIG. 7, a third operational mode (i.e., blended mode) may be a parallel workflow in which the assistant system 140 processes a user input and provides assistance to the user by performing client-side processes locally on the client system 130 in conjunction with server-side processes on one or more remote servers (e.g., a server associated with assistant system 140). For example, the client system 130 and the server associated with assistant system 140 may both perform automatic speech recognition (ASR) and natural-language understanding (NLU) processes, but the client system 130 may delegate dialog, agent, and natural-language generation (NLG) processes to be performed by the server associated with assistant system 140.

In particular embodiments, selection of an operational mode may be based at least in part on a device state, a task associated with a user input, and/or one or more additional factors. As an example and not by way of limitation, as described above, one factor may be a network connectivity status for client system 130. For example, if the client system 130 is not connected to a network 110 (i.e., when client system 130 is offline), the assistant system 140 may handle a user input in the first operational mode (i.e., on-device mode). As another example and not by way of limitation, another factor may be based on a measure of available battery power (i.e., battery status) for the client system 130. For example, if there is a need for client system 130 to conserve battery power (e.g., when client system 130 has minimal available battery power or the user has indicated a desire to conserve the battery power of the client system 130), the assistant system 140 may handle a user input in the second operational mode (i.e., cloud mode) or the third operational mode (i.e., blended mode) in order to perform fewer power-intensive operations on the client system 130. As yet another example and not by way of limitation, another factor may be one or more privacy constraints (e.g., specified privacy settings, applicable privacy policies). For example, if one or more privacy constraints limits or precludes particular data from being transmitted to a remote server (e.g., a server associated with the assistant system 140), the assistant system 140 may handle a user input in the first operational mode (i.e., on-device mode) in order to protect user privacy. As yet another example and not by way of limitation, another factor may be desynchronized context data between the client system 130 and a remote server (e.g., the server associated with assistant system 140). For example, the client system 130 and the server associated with assistant system 140 may be determined to have inconsistent, missing, and/or unreconciled context data, the assistant system 140 may handle a user input in the third operational mode (i.e., blended mode) to reduce the likelihood of an inadequate analysis associated with the user input. As yet another example and not by way of limitation, another factor may be a measure of latency for the connection between client system 130 and a remote server (e.g., the server associated with assistant system 140). For example, if a task associated with a user input may significantly benefit from and/or require prompt or immediate execution (e.g., photo capturing tasks), the assistant system 140 may handle the user input in the first operational mode (i.e., on-device mode) to ensure the task is performed in a timely manner. As yet another example and not by way of limitation, another factor may be, for a feature relevant to a task associated with a user input, whether the feature is only supported by a remote server (e.g., the server associated with assistant system 140). For example, if the relevant feature requires advanced technical functionality (e.g., high-powered processing capabilities, rapid update cycles) that is only supported by the server associated with assistant system 140 and is not supported by client system 130 at the time of the user input, the assistant system 140 may handle the user input in the second operational mode (i.e., cloud mode) or the third operational mode (i.e., blended mode) in order to benefit from the relevant feature.

In particular embodiments, an on-device orchestrator 706 on the client system 130 may coordinate receiving a user input and may determine, at one or more decision points in an example workflow, which of the operational modes described above should be used to process or continue processing the user input. As discussed above, selection of an operational mode may be based at least in part on a device state, a task associated with a user input, and/or one or more additional factors. As an example and not by way of limitation, with reference to the workflow architecture illustrated in FIG. 7, after a user input is received from a user, the on-device orchestrator 706 may determine, at decision point (DO) 705, whether to begin processing the user input in the first operational mode (i.e., on-device mode), the second operational mode (i.e., cloud mode), or the third operational mode (i.e., blended mode). For example, at decision point (DO) 705, the on-device orchestrator 706 may select the first operational mode (i.e., on-device mode) if the client system 130 is not connected to network 110 (i.e., when client system 130 is offline), if one or more privacy constraints expressly require on-device processing (e.g., adding or removing another person to a private call between users), or if the user input is associated with a task which does not require or benefit from server-side processing (e.g., setting an alarm or calling another user). As another example, at decision point (DO) 705, the on-device orchestrator 706 may select the second operational mode (i.e., cloud mode) or the third operational mode (i.e., blended mode) if the client system 130 has a need to conserve battery power (e.g., when client system 130 has minimal available battery power or the user has indicated a desire to conserve the battery power of the client system 130) or has a need to limit additional utilization of computing resources (e.g., when other processes operating on client device 130 require high CPU utilization (e.g., SMS messaging applications)).

In particular embodiments, if the on-device orchestrator 706 determines at decision point (DO) 705 that the user input should be processed using the first operational mode (i.e., on-device mode) or the third operational mode (i.e., blended mode), the client-side process may continue as illustrated in FIG. 7. As an example and not by way of limitation, if the user input comprises speech data, the speech data may be received at a local automatic speech recognition (ASR) module 708a on the client system 130. The ASR module 708a may allow a user to dictate and have speech transcribed as written text, have a document synthesized as an audio stream, or issue commands that are recognized as such by the system.

In particular embodiments, the output of the ASR module 708a may be sent to a local natural-language understanding (NLU) module 710a. The NLU module 710a may perform named entity resolution (NER), or named entity resolution may be performed by the entity resolution module 712a, as described below. In particular embodiments, one or more of an intent, a slot, or a domain may be an output of the NLU module 710a.

In particular embodiments, the user input may comprise non-speech data, which may be received at a local context engine 720a. As an example and not by way of limitation, the non-speech data may comprise locations, visuals, touch, gestures, world updates, social updates, contextual information, information related to people, activity data, and/or any other suitable type of non-speech data. The non-speech data may further comprise sensory data received by client system 130 sensors (e.g., microphone, camera), which may be accessed subject to privacy constraints and further analyzed by computer vision technologies. In particular embodiments, the computer vision technologies may comprise object detection, scene recognition, hand tracking, eye tracking, and/or any other suitable computer vision technologies. In particular embodiments, the non-speech data may be subject to geometric constructions, which may comprise constructing objects surrounding a user using any suitable type of data collected by a client system 130. As an example and not by way of limitation, a user may be wearing AR glasses, and geometric constructions may be utilized to determine spatial locations of surfaces and items (e.g., a floor, a wall, a user's hands). In particular embodiments, the non-speech data may be inertial data captured by AR glasses or a VR headset, and which may be data associated with linear and angular motions (e.g., measurements associated with a user's body movements). In particular embodiments, the context engine 720a may determine various types of events and context based on the non-speech data.

In particular embodiments, the outputs of the NLU module 710a and/or the context engine 720a may be sent to an entity resolution module 712a. The entity resolution module 712a may resolve entities associated with one or more slots output by NLU module 710a. In particular embodiments, each resolved entity may be associated with one or more entity identifiers. As an example and not by way of limitation, an identifier may comprise a unique user identifier (ID) corresponding to a particular user (e.g., a unique username or user ID number for the extended-reality system 160). In particular embodiments, each resolved entity may also be associated with a confidence score. More information on resolving entities may be found in U.S. Pat. No. 10,803,050, filed 27 Jul. 2018, and U.S. patent application Ser. No. 16/048,072, filed 27 Jul. 2018, each of which is incorporated by reference.

In particular embodiments, at decision point (DO) 705, the on-device orchestrator 706 may determine that a user input should be handled in the second operational mode (i.e., cloud mode) or the third operational mode (i.e., blended mode). In these operational modes, the user input may be handled by certain server-side modules in a similar manner as the client-side process described above.

In particular embodiments, if the user input comprises speech data, the speech data of the user input may be received at a remote automatic speech recognition (ASR) module 708b on a remote server (e.g., the server associated with assistant system 140). The ASR module 708b may allow a user to dictate and have speech transcribed as written text, have a document synthesized as an audio stream, or issue commands that are recognized as such by the system.

In particular embodiments, the output of the ASR module 708b may be sent to a remote natural-language understanding (NLU) module 710b. In particular embodiments, the NLU module 710b may perform named entity resolution (NER) or named entity resolution may be performed by entity resolution module 712b of dialog manager module 716b as described below. In particular embodiments, one or more of an intent, a slot, or a domain may be an output of the NLU module 710b.

In particular embodiments, the user input may comprise non-speech data, which may be received at a remote context engine 720b. In particular embodiments, the remote context engine 720b may determine various types of events and context based on the non-speech data. In particular embodiments, the output of the NLU module 710b and/or the context engine 720b may be sent to a remote dialog manager 716b.

In particular embodiments, as discussed above, an on-device orchestrator 706 on the client system 130 may coordinate receiving a user input and may determine, at one or more decision points in an example workflow, which of the operational modes described above should be used to process or continue processing the user input. As further discussed above, selection of an operational mode may be based at least in part on a device state, a task associated with a user input, and/or one or more additional factors. As an example and not by way of limitation, with continued reference to the workflow architecture illustrated in FIG. 7, after the entity resolution module 712a generates an output or a null output, the on-device orchestrator 706 may determine, at decision point (D1) 715, whether to continue processing the user input in the first operational mode (i.e., on-device mode), the second operational mode (i.e., cloud mode), or the third operational mode (i.e., blended mode). For example, at decision point (D1) 715, the on-device orchestrator 706 may select the first operational mode (i.e., on-device mode) if an identified intent is associated with a latency sensitive processing task (e.g., taking a photo, pausing a stopwatch). As another example and not by way of limitation, if a messaging task is not supported by on-device processing on the client system 130, the on-device orchestrator 706 may select the third operational mode (i.e., blended mode) to process the user input associated with a messaging request. As yet another example, at decision point (D1) 715, the on-device orchestrator 706 may select the second operational mode (i.e., cloud mode) or the third operational mode (i.e., blended mode) if the task being processed requires access to a social graph, a knowledge graph, or a concept graph not stored on the client system 130. Alternatively, the on-device orchestrator 706 may instead select the first operational mode (i.e., on-device mode) if a sufficient version of an informational graph including requisite information for the task exists on the client system 130 (e.g., a smaller and/or bootstrapped version of a knowledge graph).

In particular embodiments, if the on-device orchestrator 706 determines at decision point (D1) 715 that processing should continue using the first operational mode (i.e., on-device mode) or the third operational mode (i.e., blended mode), the client-side process may continue as illustrated in FIG. 7. As an example and not by way of limitation, the output from the entity resolution module 712a may be sent to an on-device dialog manager 716a. In particular embodiments, the on-device dialog manager 716a may comprise a dialog state tracker 718a and an action selector 722a. The on-device dialog manager 716a may have complex dialog logic and product-related business logic to manage the dialog state and flow of the conversation between the user and the assistant system 140. The on-device dialog manager 716a may include full functionality for end-to-end integration and multi-turn support (e.g., confirmation, disambiguation). The on-device dialog manager 716a may also be lightweight with respect to computing limitations and resources including memory, computation (CPU), and binary size constraints. The on-device dialog manager 716a may also be scalable to improve developer experience. In particular embodiments, the on-device dialog manager 716a may benefit the assistant system 140, for example, by providing offline support to alleviate network connectivity issues (e.g., unstable or unavailable network connections), by using client-side processes to prevent privacy-sensitive information from being transmitted off of client system 130, and by providing a stable user experience in high-latency sensitive scenarios.

In particular embodiments, the on-device dialog manager 716a may further conduct false trigger mitigation. Implementation of false trigger mitigation may detect and prevent false triggers from user inputs which would otherwise invoke the assistant system 140 (e.g., an unintended wakeword) and may further prevent the assistant system 140 from generating data records based on the false trigger that may be inaccurate and/or subject to privacy constraints. As an example and not by way of limitation, if a user is in a voice call, the user's conversation during the voice call may be considered private, and the false trigger mitigation may limit detection of wake-words to audio user inputs received locally by the user's client system 130. In particular embodiments, the on-device dialog manager 716a may implement false trigger mitigation based on a nonsense detector. If the nonsense detector determines with a high confidence that a received wake-word is not logically and/or contextually sensible at the point in time at which it was received from the user, the on-device dialog manager 716a may determine that the user did not intend to invoke the assistant system 140.

In particular embodiments, due to a limited computing power of the client system 130, the on-device dialog manager 716a may conduct on-device learning based on learning algorithms particularly tailored for client system 130. As an example and not by way of limitation, federated learning techniques may be implemented by the on-device dialog manager 716a. Federated learning is a specific category of distributed machine learning techniques which may train machine-learning models using decentralized data stored on end devices (e.g., mobile phones). In particular embodiments, the on-device dialog manager 716a may use federated user representation learning model to extend existing neural-network personalization techniques to implementation of federated learning by the on-device dialog manager 716a. Federated user representation learning may personalize federated learning models by learning task-specific user representations (i.e., embeddings) and/or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged by a remote server (e.g., the server associated with assistant system 140). Federated parameters, by contrast, may be trained remotely on the server. In particular embodiments, the on-device dialog manager 716a may use an active federated learning model, which may transmit a global model trained on the remote server to client systems 130 and calculate gradients locally on the client systems 130. Active federated learning may enable the on-device dialog manager 716a to minimize the transmission costs associated with downloading models and uploading gradients. For active federated learning, in each round, client systems 130 may be selected in a semi-random manner based at least in part on a probability conditioned on the current model and the data on the client systems 130 in order to optimize efficiency for training the federated learning model.

In particular embodiments, the dialog state tracker 718a may track state changes over time as a user interacts with the world and the assistant system 140 interacts with the user. As an example and not by way of limitation, the dialog state tracker 718a may track, for example, what the user is talking about, whom the user is with, where the user is, what tasks are currently in progress, and where the user's gaze is at subject to applicable privacy policies.

In particular embodiments, at decision point (D1) 715, the on-device orchestrator 706 may determine to forward the user input to the server for either the second operational mode (i.e., cloud mode) or the third operational mode (i.e., blended mode). As an example and not by way of limitation, if particular functionalities or processes (e.g., messaging) are not supported by on the client system 130, the on-device orchestrator 706 may determine at decision point (D1) 715 to use the third operational mode (i.e., blended mode). In particular embodiments, the on-device orchestrator 706 may cause the outputs from the NLU module 710*a*, the context engine 720*a*, and the entity resolution module 712*a*, via a dialog manager proxy 724, to be forwarded to an entity resolution module 712*b* of the remote dialog manager 716*b* to continue the processing. The dialog manager proxy 724 may be a communication channel for information/events exchange between the client system 130 and the server. In particular embodiments, the dialog manager 716*b* may additionally comprise a remote arbitrator 726*b*, a remote dialog state tracker 718*b*, and a remote action selector 722*b*. In particular embodiments, the assistant system 140 may have started processing a user input with the second operational mode (i.e., cloud mode) at decision point (DO) 705 and the on-device orchestrator 706 may determine to continue processing the user input based on the second operational mode (i.e., cloud mode) at decision point (D1) 715. Accordingly, the output from the NLU module 710*b* and the context engine 720*b* may be received at the remote entity resolution module 712*b*. The remote entity resolution module 712*b* may have similar functionality as the local entity resolution module 712*a*, which may comprise resolving entities associated with the slots. In particular embodiments, the entity resolution module 712*b* may access one or more of the social graph, the knowledge graph, or the concept graph when resolving the entities. The output from the entity resolution module 712*b* may be received at the arbitrator 726*b*.

In particular embodiments, the remote arbitrator 726*b* may be responsible for choosing between client-side and server-side upstream results (e.g., results from the NLU module 710*a/b*, results from the entity resolution module 712*a/b*, and results from the context engine 720*a/b*). The arbitrator 726*b* may send the selected upstream results to the remote dialog state tracker 718*b*. In particular embodiments, similarly to the local dialog state tracker 718*a*, the remote dialog state tracker 718*b* may convert the upstream results into candidate tasks using task specifications and resolve arguments with entity resolution.

In particular embodiments, at decision point (D2) 725, the on-device orchestrator 706 may determine whether to continue processing the user input based on the first operational mode (i.e., on-device mode) or forward the user input to the server for the third operational mode (i.e., blended mode). The decision may depend on, for example, whether the client-side process is able to resolve the task and slots successfully, whether there is a valid task policy with a specific feature support, and/or the context differences between the client-side process and the server-side process. In particular embodiments, decisions made at decision point (D2) 725 may be for multi-turn scenarios. In particular embodiments, there may be at least two possible scenarios. In a first scenario, the assistant system 140 may have started processing a user input in the first operational mode (i.e., on-device mode) using client-side dialog state. If at some point the assistant system 140 decides to switch to having the remote server process the user input, the assistant system 140 may create a programmatic/predefined task with the current task state and forward it to the remote server. For subsequent turns, the assistant system 140 may continue processing in the third operational mode (i.e., blended mode) using the server-side dialog state. In another scenario, the assistant system 140 may have started processing the user input in either the second operational mode (i.e., cloud mode) or the third operational mode (i.e., blended mode) and may substantially rely on server-side dialog state for all subsequent turns. If the on-device orchestrator 706 determines to continue processing the user input based on the first operational mode (i.e., on-device mode), the output from the dialog state tracker 718*a* may be received at the action selector 722*a*.

In particular embodiments, at decision point (D2) 725, the on-device orchestrator 706 may determine to forward the user input to the remote server and continue processing the user input in either the second operational mode (i.e., cloud mode) or the third operational mode (i.e., blended mode). The assistant system 140 may create a programmatic/predefined task with the current task state and forward it to the server, which may be received at the action selector 722*b*. In particular embodiments, the assistant system 140 may have started processing the user input in the second operational mode (i.e., cloud mode), and the on-device orchestrator 706 may determine to continue processing the user input in the second operational mode (i.e., cloud mode) at decision point (D2) 725. Accordingly, the output from the dialog state tracker 718*b* may be received at the action selector 722*b*.

In particular embodiments, the action selector 722*a/b* may perform interaction management. The action selector 722*a/b* may determine and trigger a set of general executable actions. The actions may be executed either on the client system 130 or at the remote server. As an example and not by way of limitation, these actions may include providing information or suggestions to the user. In particular embodiments, the actions may interact with agents 728*a/b*, users, and/or the assistant system 140 itself. These actions may comprise actions including one or more of a slot request, a confirmation, a disambiguation, or an agent execution. The actions may be independent of the underlying implementation of the action selector 722*a/b*. For more complicated scenarios such as, for example, multi-turn tasks or tasks with complex business logic, the local action selector 722*a* may call one or more local agents 728*a*, and the remote action selector 722*b* may call one or more remote agents 728*b* to execute the actions. Agents 728*a/b* may be invoked via task ID, and any actions may be routed to the correct agent 728*a/b* using that task ID. In particular embodiments, an agent 728*a/b* may be configured to serve as a broker across a plurality of content providers for one domain. A content provider may be an entity responsible for carrying out an action associated with an intent or completing a task associated with the intent. In particular embodiments, agents 728*a/b* may provide several functionalities for the assistant system 140 including, for example, native template generation, task specific business logic, and querying external APIs. When executing actions for a task, agents 728*a/b* may use context from the dialog state tracker 718*a/b*, and may also update the dialog state tracker 718*a/b*. In particular embodiments, agents 728*a/b* may also generate partial payloads from a dialog act.

In particular embodiments, the local agents 728*a* may have different implementations to be compiled/registered for different platforms (e.g., smart glasses versus a VR headset). In particular embodiments, multiple device-specific implementations (e.g., real-time calls for a client system 130 or a messaging application on the client system 130) may be handled internally by a single agent 728*a*. Alternatively, device-specific implementations may be handled by multiple agents 728*a* associated with multiple domains. As an example and not by way of limitation, calling an agent 628*a* on smart glasses may be implemented in a different manner than calling an agent 728*a* on a smart phone. Different platforms may also utilize varying numbers of agents 728*a*. The agents 728*a* may also be cross-platform (i.e., different operating systems on the client system 130). In addition, the agents 228a may have minimized startup time or binary size impact. Local agents 728a may be suitable for particular use cases. As an example and not by way of limitation, one use case may be emergency calling on the client system 130. As another example and not by way of limitation, another use case may be responding to a user input without network connectivity. As yet another example and not by way of limitation, another use case may be that particular domains/tasks may be privacy sensitive and may prohibit user inputs being sent to the remote server.

In particular embodiments, the local action selector 722a may call a local delivery system 730a for executing the actions, and the remote action selector 722b may call a remote delivery system 730b for executing the actions. The delivery system 730a/b may deliver a predefined event upon receiving triggering signals from the dialog state tracker 718a/b by executing corresponding actions. The delivery system 730a/b may ensure that events get delivered to a host with a living connection. As an example and not by way of limitation, the delivery system 730a/b may broadcast to all online devices that belong to one user. As another example and not by way of limitation, the delivery system 730a/b may deliver events to target-specific devices. The delivery system 730a/b may further render a payload using up-to-date device context.

In particular embodiments, the on-device dialog manager 716a may additionally comprise a separate local action execution module, and the remote dialog manager 716b may additionally comprise a separate remote action execution module. The local execution module and the remote action execution module may have similar functionality. In particular embodiments, the action execution module may call the agents 728a/b to execute tasks. The action execution module may additionally perform a set of general executable actions determined by the action selector 722a/b. The set of executable actions may interact with agents 728a/b, users, and the assistant system 140 itself via the delivery system 730a/b.

In particular embodiments, if the user input is handled using the first operational mode (i.e., on-device mode), results from the agents 728a and/or the delivery system 730a may be returned to the on-device dialog manager 716a. The on-device dialog manager 716a may then instruct a local arbitrator 726a to generate a final response based on these results. The arbitrator 726a may aggregate the results and evaluate them. As an example and not by way of limitation, the arbitrator 726a may rank and select a best result for responding to the user input. If the user request is handled in the second operational mode (i.e., cloud mode), the results from the agents 728b and/or the delivery system 730b may be returned to the remote dialog manager 716b. The remote dialog manager 716b may instruct, via the dialog manager proxy 724, the arbitrator 726a to generate the final response based on these results. Similarly, the arbitrator 726a may analyze the results and select the best result to provide to the user. If the user input is handled based on the third operational mode (i.e., blended mode), the client-side results and server-side results (e.g., from agents 728a/b and/or delivery system 730a/b) may both be provided to the arbitrator 726a by the on-device dialog manager 716a and remote dialog manager 716b, respectively. The arbitrator 726 may then choose between the client-side and server-side side results to determine the final result to be presented to the user. In particular embodiments, the logic to decide between these results may depend on the specific use-case.

In particular embodiments, the local arbitrator 726a may generate a response based on the final result and send it to a render output module 732. The render output module 732 may determine how to render the output in a way that is suitable for the client system 130. As an example and not by way of limitation, for a VR headset or AR smart glasses, the render output module 732 may determine to render the output using a visual-based modality (e.g., an image or a video clip) that may be displayed via the VR headset or AR smart glasses. As another example, the response may be rendered as audio signals that may be played by the user via a VR headset or AR smart glasses. As yet another example, the response may be rendered as augmented-reality data for enhancing user experience.

In particular embodiments, in addition to determining an operational mode to process the user input, the on-device orchestrator 706 may also determine whether to process the user input on the rendering device 137, process the user input on the companion device 138, or process the user request on the remote server. The rendering device 137 and/or the companion device 138 may each use the assistant stack in a similar manner as disclosed above to process the user input. As an example and not by, the on-device orchestrator 706 may determine that part of the processing should be done on the rendering device 137, part of the processing should be done on the companion device 138, and the remaining processing should be done on the remote server.

In particular embodiments, the assistant system 140 may have a variety of capabilities including audio cognition, visual cognition, signals intelligence, reasoning, and memories. In particular embodiments, the capability of audio cognition may enable the assistant system 140 to, for example, understand a user's input associated with various domains in different languages, understand and summarize a conversation, perform on-device audio cognition for complex commands, identify a user by voice, extract topics from a conversation and auto-tag sections of the conversation, enable audio interaction without a wake-word, filter and amplify user voice from ambient noise and conversations, and/or understand which client system 130 a user is talking to if multiple client systems 130 are in vicinity.

In particular embodiments, the capability of visual cognition may enable the assistant system 140 to, for example, recognize interesting objects in the world through a combination of existing machine-learning models and one-shot learning, recognize an interesting moment and auto-capture it, achieve semantic understanding over multiple visual frames across different episodes of time, provide platform support for additional capabilities in places or objects recognition, recognize a full set of settings and micro-locations including personalized locations, recognize complex activities, recognize complex gestures to control a client system 130, handle images/videos from egocentric cameras (e.g., with motion, capture angles, resolution), accomplish similar levels of accuracy and speed regarding images with lower resolution, conduct one-shot registration and recognition of places and objects, and/or perform visual recognition on a client system 130.

In particular embodiments, the assistant system 140 may leverage computer vision techniques to achieve visual cognition. Besides computer vision techniques, the assistant system 140 may explore options that may supplement these techniques to scale up the recognition of objects. In particular embodiments, the assistant system 140 may use supplemental signals such as, for example, optical character recognition (OCR) of an object's labels, GPS signals for places recognition, and/or signals from a user's client system 130 to identify the user. In particular embodiments, the assistant system 140 may perform general scene recognition (e.g., home, work, public spaces) to set a context for the user and reduce the computer-vision search space to identify likely objects or people. In particular embodiments, the assistant system 140 may guide users to train the assistant system 140. For example, crowdsourcing may be used to get users to tag objects and help the assistant system 140 recognize more objects over time. As another example, users may register their personal objects as part of an initial setup when using the assistant system 140. The assistant system 140 may further allow users to provide positive/negative signals for objects they interact with to train and improve personalized models for them.

In particular embodiments, the capability of signals intelligence may enable the assistant system 140 to, for example, determine user location, understand date/time, determine family locations, understand users' calendars and future desired locations, integrate richer sound understanding to identify setting/context through sound alone, and/or build signals intelligence models at runtime which may be personalized to a user's individual routines.

In particular embodiments, the capability of reasoning may enable the assistant system 140 to, for example, pick up previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, and/or understand the changes in a scene and how that may impact the user's desired content.

In particular embodiments, the capabilities of memories may enable the assistant system 140 to, for example, remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and/or write to memory in structured form to form rich short, episodic and long-term memories.

Figure 8:
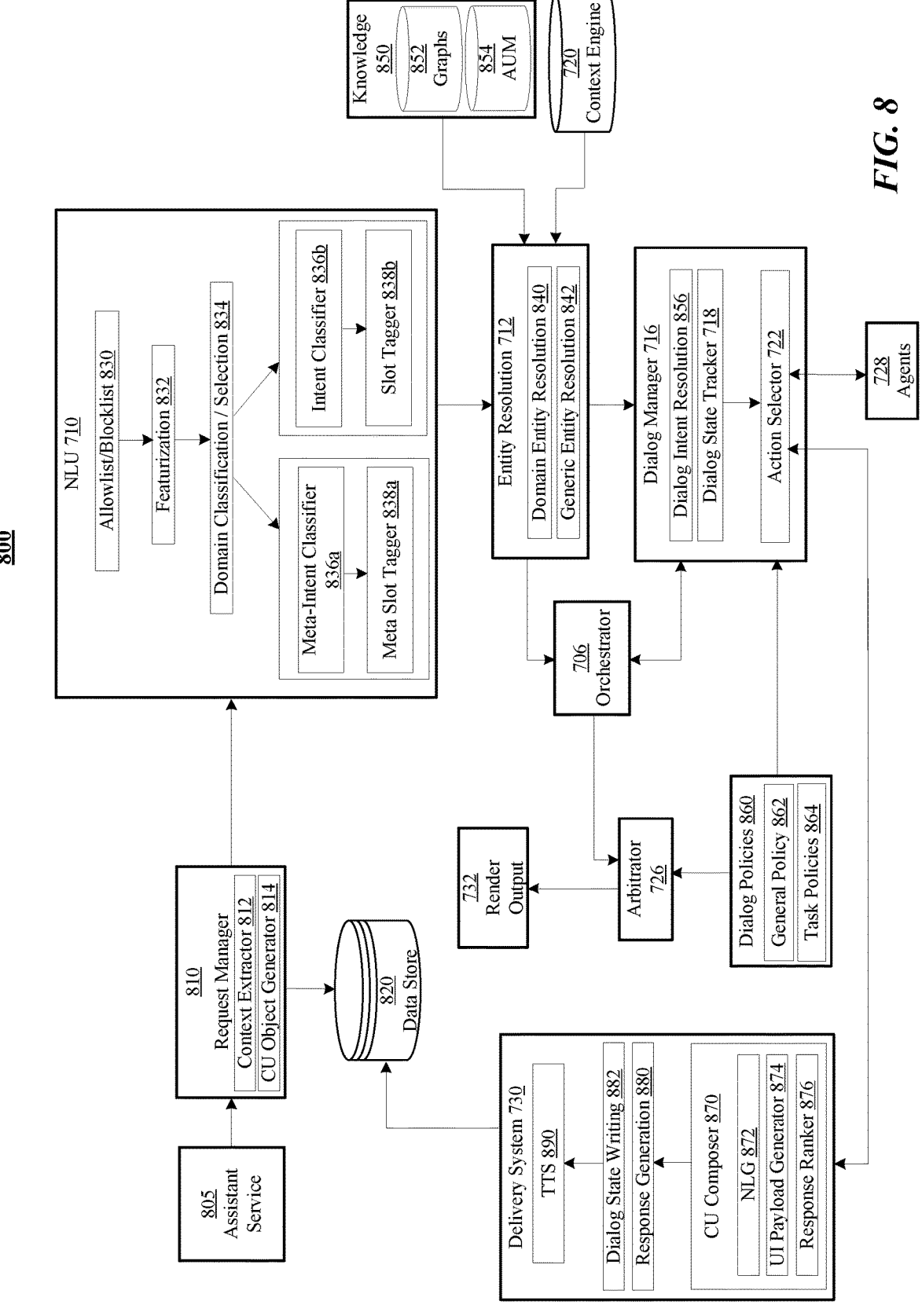
FIG. 8 illustrates an example flow diagram of the assistant system.

FIG. 8 illustrates an example flow diagram 800 of the assistant system 140. In particular embodiments, an assistant service module 805 may access a request manager 810 upon receiving a user input. In particular embodiments, the request manager 810 may comprise a context extractor 812 and a conversational understanding object generator (CU object generator) 814. The context extractor 812 may extract contextual information associated with the user input. The context extractor 812 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 814 may generate particular CU objects relevant to the user input. The CU objects may comprise dialog-session data and features associated with the user input, which may be shared with all the modules of the assistant system 140. In particular embodiments, the request manager 810 may store the contextual information and the generated CU objects in a data store 820 which is a particular data store implemented in the assistant system 140.

In particular embodiments, the request manger 810 may send the generated CU objects to the NLU module 710. The NLU module 710 may perform a plurality of steps to process the CU objects. The NLU module 710 may first run the CU objects through an allowlist/blocklist 830. In particular embodiments, the allowlist/blocklist 830 may comprise interpretation data matching the user input. The NLU module 710 may then perform a featurization 832 of the CU objects. The NLU module 710 may then perform domain classification/selection 834 on user input based on the features resulted from the featurization 832 to classify the user input into predefined domains. In particular embodiments, a domain may denote a social context of interaction (e.g., education), or a namespace for a set of intents (e.g., music). The domain classification/selection results may be further processed based on two related procedures. In one procedure, the NLU module 710 may process the domain classification/selection results using a meta-intent classifier 836a. The meta-intent classifier 836a may determine categories that describe the user's intent. An intent may be an element in a pre-defined taxonomy of semantic intentions, which may indicate a purpose of a user interaction with the assistant system 140. The NLU module 710a may classify a user input into a member of the pre-defined taxonomy. For example, the user input may be "Play Beethoven's 5th," and the NLU module 710a may classify the input as having the intent [IN:play_music]. In particular embodiments, intents that are common to multiple domains may be processed by the meta-intent classifier 836a. As an example and not by way of limitation, the meta-intent classifier 836a may be based on a machine-learning model that may take the domain classification/selection results as input and calculate a probability of the input being associated with a particular predefined meta-intent. The NLU module 710 may then use a meta slot tagger 838a to annotate one or more meta slots for the classification result from the meta-intent classifier 836a. A slot may be a named sub-string corresponding to a character string within the user input representing a basic semantic entity. For example, a slot for "pizza" may be [SL:dish]. In particular embodiments, a set of valid or expected named slots may be conditioned on the classified intent. As an example and not by way of limitation, for the intent [IN:play_music], a valid slot may be [SL:song_name]. In particular embodiments, the meta slot tagger 838a may tag generic slots such as references to items (e.g., the first), the type of slot, the value of the slot, etc. In particular embodiments, the NLU module 710 may process the domain classification/selection results using an intent classifier 836b. The intent classifier 836b may determine the user's intent associated with the user input. In particular embodiments, there may be one intent classifier 836b for each domain to determine the most possible intents in a given domain. As an example and not by way of limitation, the intent classifier 836b may be based on a machine-learning model that may take the domain classification/selection results as input and calculate a probability of the input being associated with a particular predefined intent. The NLU module 710 may then use a slot tagger 838b to annotate one or more slots associated with the user input. In particular embodiments, the slot tagger 838b may annotate the one or more slots for the n-grams of the user input. As an example and not by way of limitation, a user input may comprise "change 500 dollars in my account to Japanese yen." The intent classifier 836b may take the user input as input and formulate it into a vector. The intent classifier 836*b* may then calculate probabilities of the user input being associated with different predefined intents based on a vector comparison between the vector representing the user input and the vectors representing different predefined intents. In a similar manner, the slot tagger 838*b* may take the user input as input and formulate each word into a vector. The slot tagger 838*b* may then calculate probabilities of each word being associated with different predefined slots based on a vector comparison between the vector representing the word and the vectors representing different predefined slots. The intent of the user may be classified as "changing money". The slots of the user input may comprise "500", "dollars", "account", and "Japanese yen". The meta-intent of the user may be classified as "financial service". The meta slot may comprise "finance".

In particular embodiments, the natural-language understanding (NLU) module 710 may additionally extract information from one or more of a social graph, a knowledge graph, or a concept graph, and may retrieve a user's profile stored locally on the client system 130. The NLU module 710 may additionally consider contextual information when analyzing the user input. The NLU module 710 may further process information from these different sources by identifying and aggregating information, annotating n-grams of the user input, ranking the n-grams with confidence scores based on the aggregated information, and formulating the ranked n-grams into features that may be used by the NLU module 710 for understanding the user input. In particular embodiments, the NLU module 710 may identify one or more of a domain, an intent, or a slot from the user input in a personalized and context-aware manner. As an example and not by way of limitation, a user input may comprise "show me how to get to the coffee shop." The NLU module 710 may identify a particular coffee shop that the user wants to go to based on the user's personal information and the associated contextual information. In particular embodiments, the NLU module 710 may comprise a lexicon of a particular language, a parser, and grammar rules to partition sentences into an internal representation. The NLU module 710 may also comprise one or more programs that perform naive semantics or stochastic semantic analysis, and may further use pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding (NLU) may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 710 may be sent to the entity resolution module 712 to resolve relevant entities. Entities may include, for example, unique users or concepts, each of which may have a unique identifier (ID). The entities may include one or more of a real-world entity (from general knowledge base), a user entity (from user memory), a contextual entity (device context/dialog context), or a value resolution (numbers, datetime, etc.). In particular embodiments, the entity resolution module 712 may comprise domain entity resolution 840 and generic entity resolution 842. The entity resolution module 712 may execute generic and domain-specific entity resolution. The generic entity resolution 842 may resolve the entities by categorizing the slots and meta slots into different generic topics. The domain entity resolution 840 may resolve the entities by categorizing the slots and meta slots into different domains. As an example and not by way of limitation, in response to the input of an inquiry of the advantages of a particular brand of electric car, the generic entity resolution 842 may resolve the referenced brand of electric car as vehicle and the domain entity resolution 840 may resolve the referenced brand of electric car as electric car.

In particular embodiments, entities may be resolved based on knowledge 850 about the world and the user. The assistant system 140 may extract ontology data from the graphs 852. As an example and not by way of limitation, the graphs 852 may comprise one or more of a knowledge graph, a social graph, or a concept graph. The ontology data may comprise the structural relationship between different slots/meta-slots and domains. The ontology data may also comprise information of how the slots/meta-slots may be grouped, related within a hierarchy where the higher level comprises the domain, and subdivided according to similarities and differences. For example, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability and/or a semantic weight. A confidence probability for an attribute value represents a probability that the value is accurate for the given attribute. A semantic weight for an attribute value may represent how the value semantically appropriate for the given attribute considering all the available information. For example, the knowledge graph may comprise an entity of a book titled "BookName", which may include information extracted from multiple content sources (e.g., an online social network, online encyclopedias, book review sources, media databases, and entertainment content sources), which may be deduped, resolved, and fused to generate the single unique record for the knowledge graph. In this example, the entity titled "BookName" may be associated with a "fantasy" attribute value for a "genre" entity attribute. More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the assistant user memory (AUM) 854 may comprise user episodic memories which help determine how to assist a user more effectively. The AUM 854 may be the central place for storing, retrieving, indexing, and searching over user data. As an example and not by way of limitation, the AUM 854 may store information such as contacts, photos, reminders, etc. Additionally, the AUM 854 may automatically synchronize data to the server and other devices (only for non-sensitive data). As an example and not by way of limitation, if the user sets a nickname for a contact on one device, all devices may synchronize and get that nickname based on the AUM 854. In particular embodiments, the AUM 854 may first prepare events, user sate, reminder, and trigger state for storing in a data store. Memory node identifiers (ID) may be created to store entry objects in the AUM 854, where an entry may be some piece of information about the user (e.g., photo, reminder, etc.) As an example and not by way of limitation, the first few bits of the memory node ID may indicate that this is a memory node ID type, the next bits may be the user ID, and the next bits may be the time of creation. The AUM 854 may then index these data for retrieval as needed. Index ID may be created for such purpose. In particular embodiments, given an "index key" (e.g., PHOTO_LOCATION) and "index value" (e.g., "San Francisco"), the AUM 854 may get a list of memory IDs that have that attribute (e.g., photos in San Francisco). As an example and not by way of limitation, the first few bits may indicate this is an index ID type, the next bits may be the user ID, and the next bits may encode an "index key" and "index value". The AUM 854 may further conduct information retrieval with a flexible query language. Relation index ID may be created for such purpose. In particular embodiments, given a source memory node and an edge type, the AUM 854 may get memory IDs of all target nodes with that type of outgoing edge from the source. As an example and not by way of limitation, the first few bits may indicate this is a relation index ID type, the next bits may be the user ID, and the next bits may be a source node ID and edge type. In particular embodiments, the AUM 854 may help detect concurrent updates of different events. More information on episodic memories may be found in U.S. patent application Ser. No. 16/552,559, filed 27 Aug. 2019, which is incorporated by reference.

In particular embodiments, the entity resolution module 712 may use different techniques to resolve different types of entities. For real-world entities, the entity resolution module 712 may use a knowledge graph to resolve the span to the entities, such as "music track", "movie", etc. For user entities, the entity resolution module 712 may use user memory or some agents to resolve the span to user-specific entities, such as "contact", "reminders", or "relationship". For contextual entities, the entity resolution module 712 may perform coreference based on information from the context engine 720 to resolve the references to entities in the context, such as "him", "her", "the first one", or "the last one". In particular embodiments, for coreference, the entity resolution module 712 may create references for entities determined by the NLU module 710. The entity resolution module 712 may then resolve these references accurately. As an example and not by way of limitation, a user input may comprise "find me the nearest grocery store and direct me there". Based on coreference, the entity resolution module 712 may interpret "there" as "the nearest grocery store". In particular embodiments, coreference may depend on the information from the context engine 720 and the dialog manager 716 so as to interpret references with improved accuracy. In particular embodiments, the entity resolution module 712 may additionally resolve an entity under the context (device context or dialog context), such as, for example, the entity shown on the screen or an entity from the last conversation history. For value resolutions, the entity resolution module 712 may resolve the mention to exact value in standardized form, such as numerical value, date time, address, etc.

In particular embodiments, the entity resolution module 712 may first perform a check on applicable privacy constraints in order to guarantee that performing entity resolution does not violate any applicable privacy policies. As an example and not by way of limitation, an entity to be resolved may be another user who specifies in their privacy settings that their identity should not be searchable on the online social network. In this case, the entity resolution module 712 may refrain from returning that user's entity identifier in response to a user input. By utilizing the described information obtained from the social graph, the knowledge graph, the concept graph, and the user profile, and by complying with any applicable privacy policies, the entity resolution module 712 may resolve entities associated with a user input in a personalized, context-aware, and privacy-protected manner.

In particular embodiments, the entity resolution module 712 may work with the ASR module 708 to perform entity resolution. The following example illustrates how the entity resolution module 712 may resolve an entity name. The entity resolution module 712 may first expand names associated with a user into their respective normalized text forms as phonetic consonant representations which may be phonetically transcribed using a double metaphone algorithm. The entity resolution module 712 may then determine an n-best set of candidate transcriptions and perform a parallel comprehension process on all of the phonetic transcriptions in the n-best set of candidate transcriptions. In particular embodiments, each transcription that resolves to the same intent may then be collapsed into a single intent. Each intent may then be assigned a score corresponding to the highest scoring candidate transcription for that intent. During the collapse, the entity resolution module 712 may identify various possible text transcriptions associated with each slot, correlated by boundary timing offsets associated with the slot's transcription. The entity resolution module 712 may then extract a subset of possible candidate transcriptions for each slot from a plurality (e.g., 1000) of candidate transcriptions, regardless of whether they are classified to the same intent. In this manner, the slots and intents may be scored lists of phrases. In particular embodiments, a new or running task capable of handling the intent may be identified and provided with the intent (e.g., a message composition task for an intent to send a message to another user). The identified task may then trigger the entity resolution module 712 by providing it with the scored lists of phrases associated with one of its slots and the categories against which it should be resolved. As an example and not by way of limitation, if an entity attribute is specified as "friend," the entity resolution module 712 may run every candidate list of terms through the same expansion that may be run at matcher compilation time. Each candidate expansion of the terms may be matched in the precompiled trie matching structure. Matches may be scored using a function based at least in part on the transcribed input, matched form, and friend name. As another example and not by way of limitation, if an entity attribute is specified as "celebrity/notable person," the entity resolution module 712 may perform parallel searches against the knowledge graph for each candidate set of terms for the slot output from the ASR module 708. The entity resolution module 712 may score matches based on matched person popularity and ASR-provided score signal. In particular embodiments, when the memory category is specified, the entity resolution module 712 may perform the same search against user memory. The entity resolution module 712 may crawl backward through user memory and attempt to match each memory (e.g., person recently mentioned in conversation, or seen and recognized via visual signals, etc.). For each entity, the entity resolution module 712 may employ matching similarly to how friends are matched (i.e., phonetic). In particular embodiments, scoring may comprise a temporal decay factor associated with a recency with which the name was previously mentioned. The entity resolution module 712 may further combine, sort, and dedupe all matches. In particular embodiments, the task may receive the set of candidates. When multiple high scoring candidates are present, the entity resolution module 712 may perform user-facilitated disambiguation (e.g., getting real-time user feedback from users on these candidates).

In particular embodiments, the context engine 720 may help the entity resolution module 712 improve entity resolution. The context engine 720 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the context engine 720 as part of the user profile. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference. In particular embodiments, the online inference service may analyze the conversational data associated with the user that are received by the assistant system 140 at a current time. The analysis result may be stored in the context engine 720 also as part of the user profile. In particular embodiments, both the offline aggregators and online inference service may extract personalization features from the plurality of data. The extracted personalization features may be used by other modules of the assistant system 140 to better understand user input. In particular embodiments, the entity resolution module 712 may process the information from the context engine 720 (e.g., a user profile) in the following steps based on natural-language processing (NLP). In particular embodiments, the entity resolution module 712 may tokenize text by text normalization, extract syntax features from text, and extract semantic features from text based on NLP. The entity resolution module 712 may additionally extract features from contextual information, which is accessed from dialog history between a user and the assistant system 140. The entity resolution module 712 may further conduct global word embedding, domain-specific embedding, and/or dynamic embedding based on the contextual information. The processing result may be annotated with entities by an entity tagger. Based on the annotations, the entity resolution module 712 may generate dictionaries. In particular embodiments, the dictionaries may comprise global dictionary features which can be updated dynamically offline. The entity resolution module 712 may rank the entities tagged by the entity tagger. In particular embodiments, the entity resolution module 712 may communicate with different graphs 852 including one or more of the social graph, the knowledge graph, or the concept graph to extract ontology data that is relevant to the retrieved information from the context engine 720. In particular embodiments, the entity resolution module 712 may further resolve entities based on the user profile, the ranked entities, and the information from the graphs 852.

In particular embodiments, the entity resolution module 712 may be driven by the task (corresponding to an agent 728). This inversion of processing order may make it possible for domain knowledge present in a task to be applied to pre-filter or bias the set of resolution targets when it is obvious and appropriate to do so. As an example and not by way of limitation, for the utterance "who is John?" no clear category is implied in the utterance. Therefore, the entity resolution module 712 may resolve "John" against everything. As another example and not by way of limitation, for the utterance "send a message to John", the entity resolution module 712 may easily determine "John" refers to a person that one can message. As a result, the entity resolution module 712 may bias the resolution to a friend. As another example and not by way of limitation, for the utterance "what is John's most famous album?" To resolve "John", the entity resolution module 712 may first determine the task corresponding to the utterance, which is finding a music album. The entity resolution module 712 may determine that entities related to music albums include singers, producers, and recording studios. Therefore, the entity resolution module 712 may search among these types of entities in a music domain to resolve "John."

In particular embodiments, the output of the entity resolution module 712 may be sent to the dialog manager 716 to advance the flow of the conversation with the user. The dialog manager 716 may be an asynchronous state machine that repeatedly updates the state and selects actions based on the new state. The dialog manager 716 may additionally store previous conversations between the user and the assistant system 140. In particular embodiments, the dialog manager 716 may conduct dialog optimization. Dialog optimization relates to the challenge of understanding and identifying the most likely branching options in a dialog with a user. As an example and not by way of limitation, the assistant system 140 may implement dialog optimization techniques to obviate the need to confirm who a user wants to call because the assistant system 140 may determine a high confidence that a person inferred based on context and available data is the intended recipient. In particular embodiments, the dialog manager 716 may implement reinforcement learning frameworks to improve the dialog optimization. The dialog manager 716 may comprise dialog intent resolution 856, the dialog state tracker 718, and the action selector 722. In particular embodiments, the dialog manager 716 may execute the selected actions and then call the dialog state tracker 718 again until the action selected requires a user response, or there are no more actions to execute. Each action selected may depend on the execution result from previous actions. In particular embodiments, the dialog intent resolution 356 may resolve the user intent associated with the current dialog session based on dialog history between the user and the assistant system 140. The dialog intent resolution 856 may map intents determined by the NLU module 710 to different dialog intents. The dialog intent resolution 856 may further rank dialog intents based on signals from the NLU module 710, the entity resolution module 712, and dialog history between the user and the assistant system 140.

In particular embodiments, the dialog state tracker 718 may use a set of operators to track the dialog state. The operators may comprise necessary data and logic to update the dialog state. Each operator may act as delta of the dialog state after processing an incoming user input. In particular embodiments, the dialog state tracker 718 may a comprise a task tracker, which may be based on task specifications and different rules. The dialog state tracker 718 may also comprise a slot tracker and coreference component, which may be rule based and/or recency based. The coreference component may help the entity resolution module 712 to resolve entities. In alternative embodiments, with the coreference component, the dialog state tracker 718 may replace the entity resolution module 712 and may resolve any references/mentions and keep track of the state. In particular embodiments, the dialog state tracker 718 may convert the upstream results into candidate tasks using task specifications and resolve arguments with entity resolution. Both user state (e.g., user's current activity) and task state (e.g., triggering conditions) may be tracked. Given the current state, the dialog state tracker 718 may generate candidate tasks the assistant system 140 may process and perform for the user. As an example and not by way of limitation, candidate tasks may include "show suggestion," "get weather information," or "take photo." In particular embodiments, the dialog state tracker 718 may generate candidate tasks based on available data from, for example, a knowledge graph, a user memory, and a user task history. In particular embodiments, the dialog state tracker 718 may then resolve the triggers object using the resolved arguments. As an example and not by way of limitation, a user input "remind me to call mom when she's online and I'm home tonight" may perform the conversion from the NLU output to the triggers representation by the dialog state tracker 718 as illustrated in Table 1 below:

In particular embodiments, the dialog state tracker 718 may work as any programmatic handler (logic) that requires versioning. In particular embodiments, instead of directly altering the dialog state, the dialog state tracker 718 may be a side-effect free component and generate n-best candidates of dialog state update operators that propose updates to the dialog state. The dialog state tracker 718 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state

TABLE 1

| Example Conversion from NLU Output to Triggers Representation | |
| --- | --- |
| NLU Ontology Representation: | Triggers Representation: |
| [IN:CREATE_SMART_REMINDER<br>Remind me to<br>  [SL:TODO call mom] when<br>  [SL:TRIGGER_CONJUNCTION<br>    [IN:GET_TRIGGER<br>      [SL:TRIGGER_SOCIAL_UPDATE<br>      she's online] and I'm<br>      [SL:TRIGGER_LOCATION home]<br>      [SL:DATE_TIME tonight]<br>    ]<br>  ]<br>] | → Triggers: {<br>  andTriggers: [<br>    condition: {ContextualEvent(mom is<br>    online)},<br>    condition: {ContextualEvent(location is<br>    home)},<br>    condition: {ContextualEvent(time is<br>    tonight)}]))]} |

In the above example, "mom," "home," and "tonight" are represented by their respective entities: personEntity, locationEntity, datetimeEntity.

In particular embodiments, the dialog manager 716 may map events determined by the context engine 720 to actions. As an example and not by way of limitation, an action may be a natural-language generation (NLG) action, a display or overlay, a device action, or a retrieval action. The dialog manager 716 may also perform context tracking and inter-action management. Context tracking may comprise aggregating real-time stream of events into a unified user state. Interaction management may comprise selecting optimal action in each state. In particular embodiments, the dialog state tracker 718 may perform context tracking (i.e., tracking events related to the user). To support processing of event streams, the dialog state tracker 718a may use an event handler (e.g., for disambiguation, confirmation, request) that may consume various types of events and update an internal assistant state. Each event type may have one or more handlers. Each event handler may be modifying a certain slice of the assistant state. In particular embodiments, the event handlers may be operating on disjoint subsets of the state (i.e., only one handler may have write-access to a particular field in the state). In particular embodiments, all event handlers may have an opportunity to process a given event. As an example and not by way of limitation, the dialog state tracker 718 may run all event handlers in parallel on every event, and then may merge the state updates proposed by each event handler (e.g., for each event, most handlers may return a NULL update).

tracker 718 may update/rank the dialog state of the current dialog session. As an example and not by way of limitation, the dialog state tracker 718 may update the dialog state as "completed" if the dialog session is over. As another example and not by way of limitation, the dialog state tracker 718 may rank the dialog state based on a priority associated with it.

In particular embodiments, the dialog state tracker 718 may communicate with the action selector 722 about the dialog intents and associated content objects. In particular embodiments, the action selector 722 may rank different dialog hypotheses for different dialog intents. The action selector 722 may take candidate operators of dialog state and consult the dialog policies 860 to decide what actions should be executed. In particular embodiments, a dialog policy 860 may a tree-based policy, which is a pre-constructed dialog plan. Based on the current dialog state, a dialog policy 860 may choose a node to execute and generate the corresponding actions. As an example and not by way of limitation, the tree-based policy may comprise topic grouping nodes and dialog action (leaf) nodes. In particular embodiments, a dialog policy 860 may also comprise a data structure that describes an execution plan of an action by an agent 728. A dialog policy 860 may further comprise multiple goals related to each other through logical operators. In particular embodiments, a goal may be an outcome of a portion of the dialog policy and it may be constructed by the dialog manager 716. A goal may be represented by an identifier (e.g., string) with one or more named arguments, which parameterize the goal. As an example and not by way of limitation, a goal with its associated goal argument may be represented as {confirm_artist, args:{artist: "Madonna"}}. In particular embodiments, goals may be mapped to leaves of the tree of the tree-structured representation of the dialog policy 860.

In particular embodiments, the assistant system 140 may use hierarchical dialog policies 860 with general policy 862 handling the cross-domain business logic and task policies 864 handling the task/domain specific logic. The general policy 862 may be used for actions that are not specific to individual tasks. The general policy 862 may be used to determine task stacking and switching, proactive tasks, notifications, etc. The general policy 862 may comprise handling low-confidence intents, internal errors, unacceptable user response with retries, and/or skipping or inserting confirmation based on ASR or NLU confidence scores. The general policy 862 may also comprise the logic of ranking dialog state update candidates from the dialog state tracker 718 output and pick the one to update (such as picking the top ranked task intent). In particular embodiments, the assistant system 140 may have a particular interface for the general policy 862, which allows for consolidating scattered cross-domain policy/business-rules, especial those found in the dialog state tracker 718, into a function of the action selector 722. The interface for the general policy 862 may also allow for authoring of self-contained sub-policy units that may be tied to specific situations or clients (e.g., policy functions that may be easily switched on or off based on clients, situation). The interface for the general policy 862 may also allow for providing a layering of policies with back-off, i.e., multiple policy units, with highly specialized policy units that deal with specific situations being backed up by more general policies 862 that apply in wider circumstances. In this context the general policy 862 may alternatively comprise intent or task specific policy.

In particular embodiments, a task policy 864 may comprise the logic for action selector 722 based on the task and current state. The task policy 864 may be dynamic and ad-hoc. In particular embodiments, the types of task policies 864 may include one or more of the following types: (1) manually crafted tree-based dialog plans; (2) coded policy that directly implements the interface for generating actions; (8) configurator-specified slot-filling tasks; or (4) machine-learning model based policy learned from data. In particular embodiments, the assistant system 140 may bootstrap new domains with rule-based logic and later refine the task policies 864 with machine-learning models. In particular embodiments, the general policy 862 may pick one operator from the candidate operators to update the dialog state, followed by the selection of a user facing action by a task policy 864. Once a task is active in the dialog state, the corresponding task policy 864 may be consulted to select right actions.

In particular embodiments, the action selector 722 may select an action based on one or more of the event determined by the context engine 720, the dialog intent and state, the associated content objects, and the guidance from dialog policies 860. Each dialog policy 860 may be subscribed to specific conditions over the fields of the state. After an event is processed and the state is updated, the action selector 722 may run a fast search algorithm (e.g., similarly to the Boolean satisfiability) to identify which policies should be triggered based on the current state. In particular embodiments, if multiple policies are triggered, the action selector 722 may use a tie-breaking mechanism to pick a particular policy. Alternatively, the action selector 722 may use a more sophisticated approach which may dry-run each policy and then pick a particular policy which may be determined to have a high likelihood of success. In particular embodiments, mapping events to actions may result in several technical advantages for the assistant system 140. One technical advantage may include that each event may be a state update from the user or the user's physical/digital environment, which may or may not trigger an action from assistant system 140. Another technical advantage may include possibilities to handle rapid bursts of events (e.g., user enters a new building and sees many people) by first consuming all events to update state, and then triggering action(s) from the final state. Another technical advantage may include consuming all events into a single global assistant state.

In particular embodiments, the action selector 722 may take the dialog state update operators as part of the input to select the dialog action. The execution of the dialog action may generate a set of expectations to instruct the dialog state tracker 718 to handle future turns. In particular embodiments, an expectation may be used to provide context to the dialog state tracker 718 when handling the user input from next turn. As an example and not by way of limitation, slot request dialog action may have the expectation of proving a value for the requested slot. In particular embodiments, both the dialog state tracker 718 and the action selector 722 may not change the dialog state until the selected action is executed. This may allow the assistant system 140 to execute the dialog state tracker 718 and the action selector 722 for processing speculative ASR results and to do n-best ranking with dry runs.

In particular embodiments, the action selector 722 may call different agents 728 for task execution. Meanwhile, the dialog manager 716 may receive an instruction to update the dialog state. As an example and not by way of limitation, the update may comprise awaiting agents' 728 response. An agent 728 may select among registered content providers to complete the action. The data structure may be constructed by the dialog manager 716 based on an intent and one or more slots associated with the intent. In particular embodiments, the agents 728 may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the extended-reality system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, shopping, social, videos, photos, events, locations, and/or work. In particular embodiments, the assistant system 140 may use a plurality of agents 728 collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, the dialog manager 716 may support multi-turn compositional resolution of slot mentions. For a compositional parse from the NLU module 710, the resolver may recursively resolve the nested slots. The dialog manager 716 may additionally support disambiguation for the nested slots. As an example and not by way of limitation, the user input may be "remind me to call Alex". The resolver may need to know which Alex to call before creating an actionable reminder to-do entity. The resolver may halt the resolution and set the resolution state when further user clarification is necessary for a particular slot. The general policy 862 may examine the resolution state and create corresponding dialog action for user clarification. In dialog state tracker 718, based on the user input and the last dialog action, the dialog manager 716 may update the nested slot. This capability may allow the assistant system 140 to interact with the user not only to collect missing slot values but also to reduce ambiguity of more complex/ambiguous utterances to complete the task. In particular embodiments, the dialog manager 716 may further support requesting missing slots in a nested intent and multi-intent user inputs (e.g., "take this photo and send it to Dad"). In particular embodiments, the dialog manager 716 may support machine-learning models for more robust dialog experience. As an example and not by way of limitation, the dialog state tracker 718 may use neural network based models (or any other suitable machine-learning models) to model belief over task hypotheses. As another example and not by way of limitation, for action selector 722, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user input.

In particular embodiments, the determined actions by the action selector 722 may be sent to the delivery system 730. The delivery system 730 may comprise a CU composer 870, a response generation component 880, a dialog state writing component 882, and a text-to-speech (TTS) component 890. Specifically, the output of the action selector 722 may be received at the CU composer 870. In particular embodiments, the output from the action selector 722 may be formulated as a <k,c,u,d> tuple, in which k indicates a knowledge source, c indicates a communicative goal, u indicates a user model, and d indicates a discourse model.

In particular embodiments, the CU composer 870 may generate a communication content for the user using a natural-language generation (NLG) component 872. In particular embodiments, the NLG component 872 may use different language models and/or language templates to generate natural-language outputs. The generation of natural-language outputs may be application specific. The generation of natural-language outputs may be also personalized for each user. In particular embodiments, the NLG component 872 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the NLG component 872 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the NLG component 872. The sentence planner may determine the organization of the communication content to make it human understandable. The surface realization component may determine specific words to use, the sequence of the sentences, and the style of the communication content.

In particular embodiments, the CU composer 870 may also determine a modality of the generated communication content using the UI payload generator 874. Since the generated communication content may be considered as a response to the user input, the CU composer 870 may additionally rank the generated communication content using a response ranker 876. As an example and not by way of limitation, the ranking may indicate the priority of the response. In particular embodiments, the CU composer 870 may comprise a natural-language synthesis (NLS) component that may be separate from the NLG component 872. The NLS component may specify attributes of the synthesized speech generated by the CU composer 870, including gender, volume, pace, style, or register, in order to customize the response for a particular user, task, or agent. The NLS component may tune language synthesis without engaging the implementation of associated tasks. In particular embodiments, the CU composer 870 may check privacy constraints associated with the user to make sure the generation of the communication content follows the privacy policies. More information on customizing natural-language generation (NLG) may be found in U.S. patent application Ser. No. 15/967,279, filed 30 Apr. 2018, and U.S. patent application Ser. No. 15/966,455, filed 30 Apr. 2018, which is incorporated by reference.

In particular embodiments, the delivery system 730 may perform different tasks based on the output of the CU composer 870. These tasks may include writing (i.e., storing/updating) the dialog state into the data store 820 using the dialog state writing component 882 and generating responses using the response generation component 880. In particular embodiments, the output of the CU composer 870 may be additionally sent to the TTS component 890 if the determined modality of the communication content is audio. In particular embodiments, the output from the delivery system 730 comprising one or more of the generated responses, the communication content, or the speech generated by the TTS component 890 may be then sent back to the dialog manager 716.

In particular embodiments, the orchestrator 706 may determine, based on the output of the entity resolution module 712, whether to processing a user input on the client system 130 or on the server, or in the third operational mode (i.e., blended mode) using both. Besides determining how to process the user input, the orchestrator 706 may receive the results from the agents 728 and/or the results from the delivery system 730 provided by the dialog manager 716. The orchestrator 706 may then forward these results to the arbitrator 726. The arbitrator 726 may aggregate these results, analyze them, select the best result, and provide the selected result to the render output module 732. In particular embodiments, the arbitrator 726 may consult with dialog policies 860 to obtain the guidance when analyzing these results. In particular embodiments, the render output module 732 may generate a response that is suitable for the client system 130.

Figure 9:
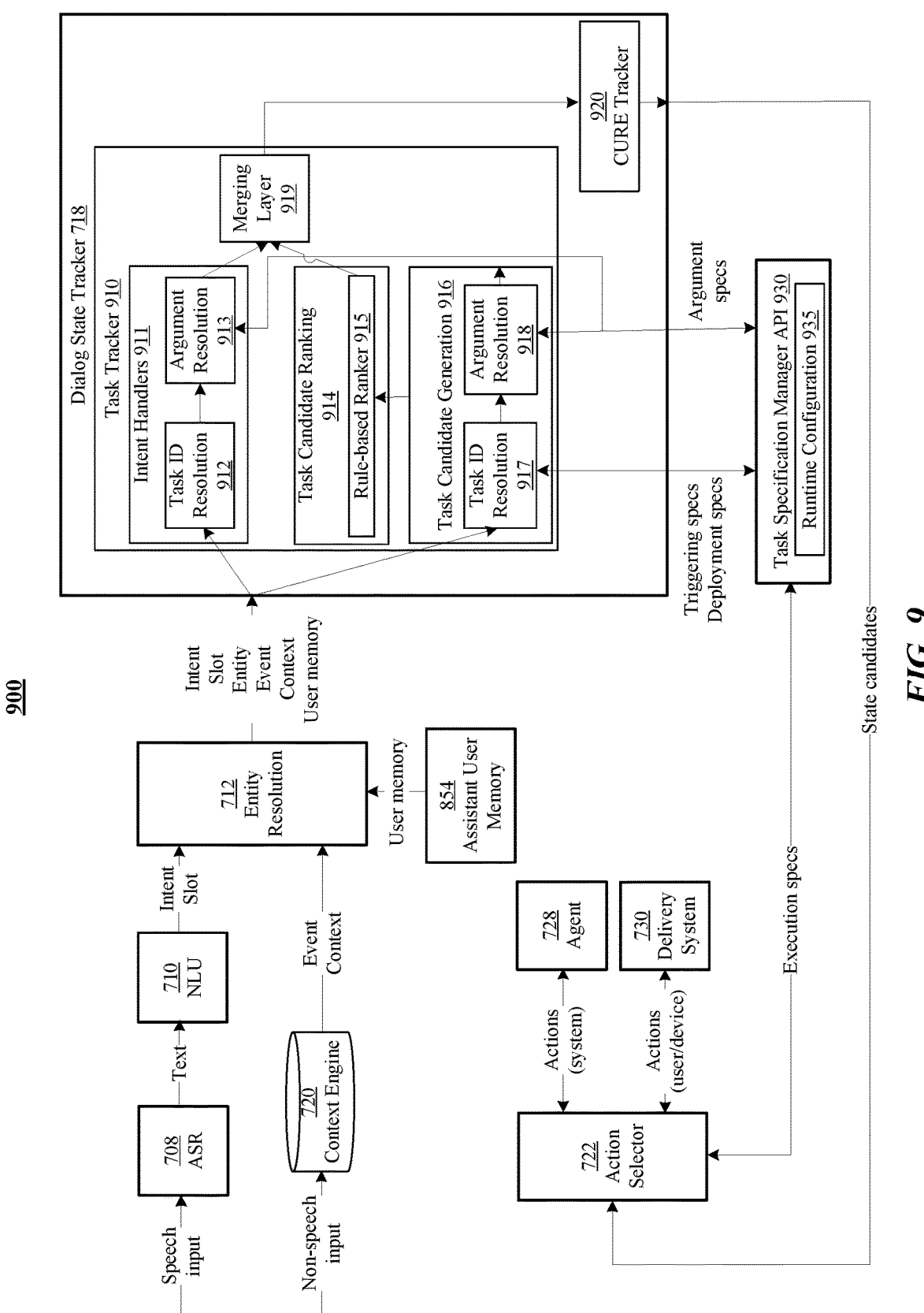
FIG. 9 illustrates an example task-centric flow diagram of processing a user input.

FIG. 9 illustrates an example task-centric flow diagram 900 of processing a user input. In particular embodiments, the assistant system 140 may assist users not only with voice-initiated experiences but also more proactive, multi-modal experiences that are initiated on understanding user context. In particular embodiments, the assistant system 140 may rely on assistant tasks for such purpose. An assistant task may be a central concept that is shared across the whole assistant stack to understand user intention, interact with the user and the world to complete the right task for the user. In particular embodiments, an assistant task may be the primitive unit of assistant capability. It may comprise data fetching, updating some state, executing some command, or complex tasks composed of a smaller set of tasks. Completing a task correctly and successfully to deliver the value to the user may be the goal that the assistant system 140 is optimized for. In particular embodiments, an assistant task may be defined as a capability or a feature. The assistant task may be shared across multiple product surfaces if they have exactly the same requirements so it may be easily tracked. It may also be passed from device to device, and easily picked up mid-task by another device since the primitive unit is consistent. In addition, the consistent format of the assistant task may allow developers working on different modules in the assistant stack to more easily design around it. Furthermore, it may allow for task sharing. As an example and not by way of limitation, if a user is listening to music on smart glasses, the user may say "play this music on my phone." In the event that the phone hasn't been woken or has a task to execute, the smart glasses may formulate a task that is provided to the phone, which may then be executed by the phone to start playing music. In particular embodiments, the assistant task may be retained by each surface separately if they have different expected behaviors. In particular embodiments, the assistant system 140 may identify the right task based on user inputs in different modality or other signals, conduct conversation to collect all necessary information, and complete that task with action selector 722 implemented internally or externally, on server or locally product surfaces. In particular embodiments, the assistant stack may comprise a set of processing components from wake-up, recognizing user inputs, understanding user intention, reasoning about the tasks, fulfilling a task to generate natural-language response with voices.

In particular embodiments, the user input may comprise speech input. The speech input may be received at the ASR module 708 for extracting the text transcription from the speech input. The ASR module 708 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 708 may comprise one or more of a grapheme-to-phoneme (G2P) model, a pronunciation learning model, a personalized acoustic model, a personalized language model (PLM), or an end-pointing model. In particular embodiments, the grapheme-to-phoneme (G2P) model may be used to determine a user's grapheme-to-phoneme style (i.e., what it may sound like when a particular user speaks a particular word). In particular embodiments, the personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may also be used to predict what words a user is most likely to say given a context. In particular embodiments, the end-pointing model may detect when the end of an utterance is reached. In particular embodiments, based at least in part on a limited computing power of the client system 130, the assistant system 140 may optimize the personalized language model at runtime during the client-side process. As an example and not by way of limitation, the assistant system 140 may pre-compute a plurality of personalized language models for a plurality of possible subjects a user may talk about. When a user input is associated with a request for assistance, the assistant system 140 may promptly switch between and locally optimize the pre-computed language models at runtime based on user activities. As a result, the assistant system 140 may preserve computational resources while efficiently identifying a subject matter associated with the user input. In particular embodiments, the assistant system 140 may also dynamically re-learn user pronunciations at runtime.

In particular embodiments, the user input may comprise non-speech input. The non-speech input may be received at the context engine 720 for determining events and context from the non-speech input. The context engine 720 may determine multi-modal events comprising voice/text intents, location updates, visual events, touch, gaze, gestures, activities, device/application events, and/or any other suitable type of events. The voice/text intents may depend on the ASR module 708 and the NLU module 710. The location updates may be consumed by the dialog manager 716 to support various proactive/reactive scenarios. The visual events may be based on person or object appearing in the user's field of view. These events may be consumed by the dialog manager 716 and recorded in transient user state to support visual co-reference (e.g., resolving "that" in "how much is that shirt?" and resolving "him" in "send him my contact"). The gaze, gesture, and activity may result in flags being set in the transient user state (e.g., user is running) which may condition the action selector 722. For the device/ application events, if an application makes an update to the device state, this may be published to the assistant system 140 so that the dialog manager 716 may use this context (what is currently displayed to the user) to handle reactive and proactive scenarios. As an example and not by way of limitation, the context engine 720 may cause a push notification message to be displayed on a display screen of the user's client system 130. The user may interact with the push notification message, which may initiate a multi-modal event (e.g., an event workflow for replying to a message received from another user). Other example multi-modal events may include seeing a friend, seeing a landmark, being at home, running, starting a call with touch, taking a photo with touch, opening an application, etc. In particular embodiments, the context engine 720 may also determine world/social events based on world/social updates (e.g., weather changes, a friend getting online). The social updates may comprise events that a user is subscribed to, (e.g., friend's birthday, posts, comments, other notifications). These updates may be consumed by the dialog manager 716 to trigger proactive actions based on context (e.g., suggesting a user call a friend on their birthday, but only if the user is not focused on something else). As an example and not by way of limitation, receiving a message may be a social event, which may trigger the task of reading the message to the user.

In particular embodiments, the text transcription from the ASR module 708 may be sent to the NLU module 710. The NLU module 710 may process the text transcription and extract the user intention (i.e., intents) and parse the slots or parsing result based on the linguistic ontology. In particular embodiments, the intents and slots from the NLU module 710 and/or the events and contexts from the context engine 720 may be sent to the entity resolution module 712. In particular embodiments, the entity resolution module 712 may resolve entities associated with the user input based on the output from the NLU module 710 and/or the context engine 720. The entity resolution module 712 may use different techniques to resolve the entities, including accessing user memory from the assistant user memory (AUM) 854. In particular embodiments, the AUM 854 may comprise user episodic memories helpful for resolving the entities by the entity resolution module 712. The AUM 854 may be the central place for storing, retrieving, indexing, and searching over user data.

In particular embodiments, the entity resolution module 712 may provide one or more of the intents, slots, entities, events, context, or user memory to the dialog state tracker 718. The dialog state tracker 718 may identify a set of state candidates for a task accordingly, conduct interaction with the user to collect necessary information to fill the state, and call the action selector 722 to fulfill the task. In particular embodiments, the dialog state tracker 718 may comprise a task tracker 910. The task tracker 910 may track the task state associated with an assistant task. In particular embodiments, a task state may be a data structure persistent cross interaction turns and updates in real time to capture the state of the task during the whole interaction. The task state may comprise all the current information about a task execution status, such as arguments, confirmation status, confidence score, etc. Any incorrect or outdated information in the task state may lead to failure or incorrect task execution. The task state may also serve as a set of contextual information for many other components such as the ASR module 708, the NLU module 710, etc.

In particular embodiments, the task tracker 910 may comprise intent handlers 911, task candidate ranking module 914, task candidate generation module 916, and merging layer 919. In particular embodiments, a task may be identified by its ID name. The task ID may be used to associate corresponding component assets if it is not explicitly set in the task specification, such as dialog policy 860, agent execution, NLG dialog act, etc. Therefore, the output from the entity resolution module 712 may be received by a task ID resolution component 917 of the task candidate generation module 916 to resolve the task ID of the corresponding task. In particular embodiments, the task ID resolution component 917 may call a task specification manager API 930 to access the triggering specifications and deployment specifications for resolving the task ID. Given these specifications, the task ID resolution component 917 may resolve the task ID using intents, slots, dialog state, context, and user memory.

In particular embodiments, the technical specification of a task may be defined by a task specification. The task specification may be used by the assistant system 140 to trigger a task, conduct dialog conversation, and find a right execution module (e.g., agents 728) to execute the task. The task specification may be an implementation of the product requirement document. It may serve as the general contract and requirements that all the components agreed on. It may be considered as an assembly specification for a product, while all development partners deliver the modules based on the specification. In particular embodiments, an assistant task may be defined in the implementation by a specification. As an example and not by way of limitation, the task specification may be defined as the following categories. One category may be a basic task schema which comprises the basic identification information such as ID, name, and the schema of the input arguments. Another category may be a triggering specification, which is about how a task can be triggered, such as intents, event message ID, etc. Another category may be a conversational specification, which is for dialog manager 716 to conduct the conversation with users and systems. Another category may be an execution specification, which is about how the task will be executed and fulfilled. Another category may be a deployment specification, which is about how a feature will be deployed to certain surfaces, local, and group of users.

In particular embodiments, the task specification manager API 930 may be an API for accessing a task specification manager. The task specification manager may be a module in the runtime stack for loading the specifications from all the tasks and providing interfaces to access all the tasks specifications for detailed information or generating task candidates. In particular embodiments, the task specification manager may be accessible for all components in the runtime stack via the task specification manager API 930. The task specification manager may comprise a set of static utility functions to manage tasks with the task specification manager, such as filtering task candidates by platform. Before landing the task specification, the assistant system 140 may also dynamically load the task specifications to support end-to-end development on the development stage.

In particular embodiments, the task specifications may be grouped by domains and stored in runtime configurations 935. The runtime stack may load all the task specifications from the runtime configurations 935 during the building time. In particular embodiments, in the runtime configurations 935, for a domain, there may be a cconf file and a cinc file (e.g., sidechef_task.cconf and sidechef_task.inc). As an example and not by way of limitation, <domain>_tasks.cconf may comprise all the details of the task specifications. As another example and not by way of limitation, <domain>_tasks.cinc may provide a way to override the generated specification if there is no support for that feature yet.

In particular embodiments, a task execution may require a set of arguments to execute. Therefore, an argument resolution component 918 may resolve the argument names using the argument specifications for the resolved task ID. These arguments may be resolved based on NLU outputs (e.g., slot [SL:contact]), dialog state (e.g., short-term calling history), user memory (such as user preferences, location, long-term calling history, etc.), or device context (such as timer states, screen content, etc.). In particular embodiments, the argument modality may be text, audio, images or other structured data. The slot to argument mapping may be defined by a filling strategy and/or language ontology. In particular embodiments, given the task triggering specifications, the task candidate generation module 916 may look for the list of tasks to be triggered as task candidates based on the resolved task ID and arguments.

In particular embodiments, the generated task candidates may be sent to the task candidate ranking module 914 to be further ranked. The task candidate ranking module 914 may use a rule-based ranker 915 to rank them. In particular embodiments, the rule-based ranker 915 may comprise a set of heuristics to bias certain domain tasks. The ranking logic may be described as below with principles of context priority. In particular embodiments, the priority of a user specified task may be higher than an on-foreground task. The priority of the on-foreground task may be higher than a device-domain task when the intent is a meta intent. The priority of the device-domain task may be higher than a task of a triggering intent domain. As an example and not by way of limitation, the ranking may pick the task if the task domain is mentioned or specified in the utterance, such as "create a timer in TIMER app". As another example and not by way of imitation, the ranking may pick the task if the task domain is on foreground or active state, such as "stop the timer" to stop the timer while the TIMER app is on foreground and there is an active timer. As yet another example and not by way of imitation, the ranking may pick the task if the intent is general meta intent, and the task is device control while there is no other active application or active state. As yet another example and not by way of imitation, the ranking may pick the task if the task is the same as the intent domain. In particular embodiments, the task candidate ranking module 914 may customize some more logic to check the match of intent/slot/entity types. The ranked task candidates may be sent to the merging layer 919.

In particular embodiments, the output from the entity resolution module 712 may also sent to a task ID resolution component 912 of the intent handlers 911. The task ID resolution component 912 may resolve the task ID of the corresponding task similarly to the task ID resolution component 917. In particular embodiments, the intent handlers 911 may additionally comprise an argument resolution component 913. The argument resolution component 913 may resolve the argument names using the argument specifications for the resolved task ID similarly to the argument resolution component 918. In particular embodiments, intent handlers 911 may deal with task agnostic features and may not be expressed within the task specifications which are task specific. Intent handlers 911 may output state candidates other than task candidates such as argument update, confirmation update, disambiguation update, etc. In particular embodiments, some tasks may require very complex triggering conditions or very complex argument filling logic that may not be reusable by other tasks even if they were supported in the task specifications (e.g., in-call voice commands, media tasks via [IN:PLAY_MEDIA], etc.). Intent handlers 911 may be also suitable for such type of tasks. In particular embodiments, the results from the intent handlers 911 may take precedence over the results from the task candidate ranking module 914. The results from the intent handlers 911 may be also sent to the merging layer 919.

In particular embodiments, the merging layer 919 may combine the results from the intent handlers 911 and the results from the task candidate ranking module 914. The dialog state tracker 718 may suggest each task as a new state for the dialog policies 860 to select from, thereby generating a list of state candidates. The merged results may be further sent to a conversational understanding reinforcement engine (CURE) tracker 920. In particular embodiments, the CURE tracker 920 may be a personalized learning process to improve the determination of the state candidates by the dialog state tracker 718 under different contexts using real-time user feedback. More information on conversational understanding reinforcement engine may be found in U.S. patent application Ser. No. 17/186,459, filed 26 Feb. 2021, which is incorporated by reference.

In particular embodiments, the state candidates generated by the CURE tracker 920 may be sent to the action selector 722. The action selector 722 may consult with the task policies 864, which may be generated from execution specifications accessed via the task specification manager API 930. In particular embodiments, the execution specifications may describe how a task should be executed and what actions the action selector 722 may need to take to complete the task.

In particular embodiments, the action selector 722 may determine actions associated with the system. Such actions may involve the agents 728 to execute. As a result, the action selector 722 may send the system actions to the agents 728 and the agents 728 may return the execution results of these actions. In particular embodiments, the action selector may determine actions associated with the user or device. Such actions may need to be executed by the delivery system 730. As a result, the action selector 722 may send the user/device actions to the delivery system 730 and the delivery system 730 may return the execution results of these actions.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Artificial Neural Networks

Figure 10:
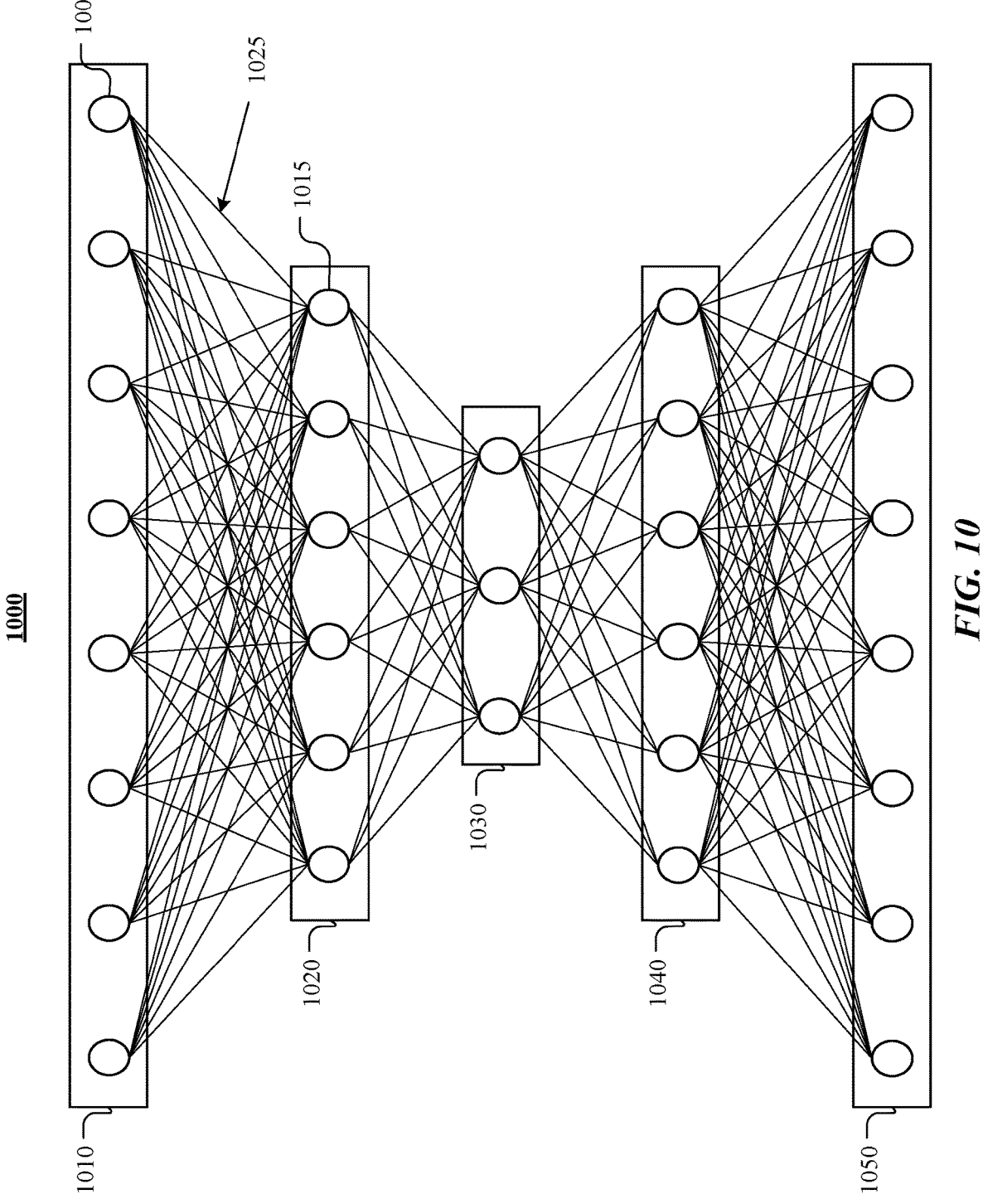
FIG. 10 illustrates an example artificial neural network.

FIG. 10 illustrates an example artificial neural network ("ANN") 1000. In particular embodiments, an ANN may refer to a computational model comprising one or more nodes. Example ANN 1000 may comprise an input layer 1010, hidden layers 1020, 1030, 1040, and an output layer 1050. Each layer of the ANN 1000 may comprise one or more nodes, such as a node 1005 or a node 1015. In particular embodiments, each node of an ANN may be connected to another node of the ANN. As an example and not by way of limitation, each node of the input layer 1010 may be connected to one of more nodes of the hidden layer 1020. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 10 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 10 depicts a connection between each node of the input layer 1010 and each node of the hidden layer 1020, one or more nodes of the input layer 1010 may not be connected to one or more nodes of the hidden layer 1020.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1020 may comprise the output of one or more nodes of the input layer 1010. As another example and not by way of limitation, the input to each node of the output layer 1050 may comprise the output of one or more nodes of the hidden layer 1040. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1025 between the node 1005 and the node 1015 may have a weighting coefficient of 0.4, which may indicate that 0.4 multiplied by the output of the node 1005 is used as an input to the node 1015. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1000 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, an extended-reality system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the extended-reality system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, the extended-reality system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the extended-reality system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the extended-reality system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the extended-reality system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list.

If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the extended-reality system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the extended-reality system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The extended-reality system 160 or assistant system 140 may access such information in order to provide a particular function or service to the first user, without the extended-reality system 160 or assistant system 140 having access to that information for any other purposes. Before accessing, storing, or using such objects or information, the extended-reality system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the extended-reality system 160 or assistant system 140.

In particular embodiments, a user may specify whether particular types of objects or information associated with the first user may be accessed, stored, or used by the extended-reality system 160 or assistant system 140. As an example and not by way of limitation, the first user may specify that images sent by the first user through the extended-reality system 160 or assistant system 140 may not be stored by the extended-reality system 160 or assistant system 140. As another example and not by way of limitation, a first user may specify that messages sent from the first user to a particular second user may not be stored by the extended-reality system 160 or assistant system 140. As yet another example and not by way of limitation, a first user may specify that all objects sent via a particular application may be saved by the extended-reality system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The extended-reality system 160 or assistant system 140 may provide default privacy settings with respect to each device, system, or application, and/or the first user may be prompted to specify a particular privacy setting for each context. As an example and not by way of limitation, the first user may utilize a location-services feature of the extended-reality system 160 or assistant system 140 to provide recommendations for restaurants or other places in proximity to the user. The first user's default privacy settings may specify that the extended-reality system 160 or assistant system 140 may use location information provided from a client system 130 of the first user to provide the location-based services, but that the extended-reality system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the extended-reality system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the extended-reality system 160 or assistant system 140. The user's privacy settings may specify that such information may be used only for particular processes, such as authentication, and further specify that such information may not be shared with any third-party system 170 or used for other processes or applications associated with the extended-reality system 160 or assistant system 140. As another example and not by way of limitation, the extended-reality system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the extended-reality system 160.

Systems and Methods

Figure 11:
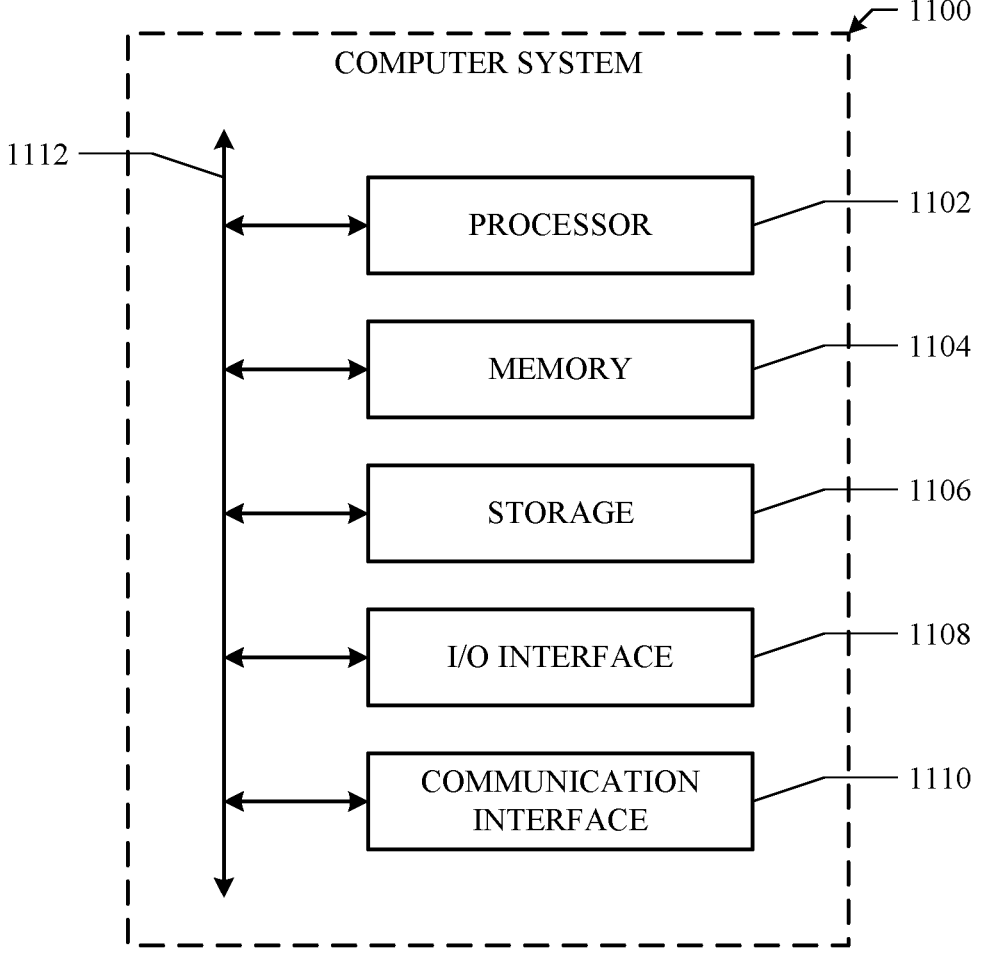
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
receiving, from a first client system associated with a first user, a voice input having a plurality of acoustic features;
determining, based on one or more of the plurality of acoustic features by one or more machine-learning models, one or more emotions associated with the voice input;
determining, based on the one or more emotions, one or more facial features for a first extended-reality (XR) avatar representing the first user;
determining whether a latency time for rendering the first XR avatar is greater than a threshold time;
delaying a transmission of one or more audio signals corresponding to the voice input to a second client system by a delay time, wherein the delay time is determined based on the latency time; and
sending, to the second client system associated with a second user, instructions for rendering the first XR avatar representing the first user, wherein the first XR avatar is rendered with the determined one or more facial features.

2. The method of claim 1, further comprising:
receiving a visual input corresponding to the voice input, wherein the visual input has a plurality of visual signals, and wherein determining the one or more emotions is further based on one or more of the visual signals.

3. The method of claim 1, further comprising:
receiving a motion input corresponding to the voice input, wherein the motion input comprises a plurality of motion signals, and wherein determining the one or more emotions is further based on one or more of the motion signals.

4. The method of claim 1, wherein the first user is in a conversation with the second user in an XR environment comprising the first XR avatar.

5. The method of claim 1, wherein the one or more machine-learning models comprise an acoustic model.

6. The method of claim 5, further comprising:
transforming, by the acoustic model, the voice input to a Mel-scale spectrogram, wherein determining the one or more emotions is further based on the Mel-scale spectrogram.

7. The method of claim 1, wherein each of the one or more emotions is associated with one or more of a range, an intensity, or a confidence score.

8. The method of claim 1, wherein the one or more emotions are associated with one or more confidence scores, respectively, and wherein the method further comprises:
ranking the one or more emotions based on their confidence scores, wherein determining the one or more facial features is based on a top-ranked emotion.

9. The method of claim 1, wherein the one or more emotions are associated with one or more confidence scores, respectively, and wherein the method further comprises:
ranking the one or more emotions based on their confidence scores; and
selecting two or more of the ranked emotions based on their rankings;
wherein determining the one or more facial features is based on the selected two or more emotions.

10. The method of claim 9, further comprising:
generating a blended emotion based on the selected two or more emotions, wherein determining the one or more facial features is based on the blended emotion.

11. The method of claim 1, wherein determining the one or more facial features comprises:
identifying a plurality of facial landmarks of the first XR avatar; and
mapping the one or more emotions to one or more pre-defined expressive shapes for a face of the first XR avatar based on the plurality of facial landmarks.

12. The method of claim 1, further comprising:
generating one or more lip movements using a lip-sync model based on the determined one or more emotions, wherein the first XR avatar is rendered further based on the one or more lip movements.

13. The method of claim 1, further comprising:
generating a recommendation of a communication content for the first user based on the determined one or more emotions; and
sending, to the first client system, instructions for presenting the recommendation of the communication content.

14. The method of claim 1, further comprising:
sending, to an assistant system executing on the first client system, the determined one or more emotions; and
receiving, from the assistant system, execution results of one or more tasks determined based on the one or more emotions.

15. The method of claim 1, further comprising:
generating a transcription for the voice input, wherein determining the one or more emotions is further based on an analysis of the transcription.

16. The method of claim 1, further comprising:
accessing a prior emotion state from a dialog state associated with the first user, wherein determining the one or more emotions is further based on the prior emotion state.

17. The method of claim 16, wherein the prior emotion state is determined based on one or more of a prior user input from the first user or a prior user input from the second user.

18. One or more computer-readable non-transitory storage media embodying software that is operable when executed to:

receive, from a first client system associated with a first user, a voice input having a plurality of acoustic features;

determine, based on one or more of the plurality of acoustic features by one or more machine-learning models, one or more emotions associated with the voice input;

determine, based on the one or more emotions, one or more facial features for a first extended-reality (XR) avatar representing the first user;

determine whether a latency time for rendering the first XR avatar is greater than a threshold time;

delay a transmission of one or more audio signals corresponding to the voice input to a second client system by a delay time, wherein the delay time is determined based on the latency time; and send, to the second client system associated with a second user, instructions for rendering the first XR avatar representing the first user, wherein the first XR avatar is rendered with the determined one or more facial features.

19. A system comprising: one or more processors; and a non-transitory memory coupled to the processors comprising instructions executable by the processors, the processors operable when executing the instructions to:

receive, from a first client system associated with a first user, a voice input having a plurality of acoustic features;

determine, based on one or more of the plurality of acoustic features by one or more machine-learning models, one or more emotions associated with the voice input;

determine, based on the one or more emotions, one or more facial features for a first extended-reality (XR) avatar representing the first user;

determine whether a latency time for rendering the first XR avatar is greater than a threshold time;

delay a transmission of one or more audio signals corresponding to the voice input to a second client system by a delay time, wherein the delay time is determined based on the latency time; and send, to the second client system associated with a second user, instructions for rendering the first XR avatar representing the first user, wherein the first XR avatar is rendered with the determined one or more facial features.

20. The system of claim 19, wherein the non-transitory memory further comprises instructions executable by the processors to:

receive a visual input corresponding to the voice input, wherein the visual input has a plurality of visual signals, and wherein determining the one or more emotions is further based on one or more of the visual signals.

* * * * *